US012750166B2

(12) United States Patent
Liu et al.

(10) Patent No.: US 12,750,166 B2
(45) Date of Patent: Sep. 29, 2026

(54) INDICATION SCHEME FOR RATELESS CODES TRANSMISSIONS WITHOUT FEEDBACK INFORMATION

(71) Applicant: QUALCOMM INCORPORATED, San Diego, CA (US)

(72) Inventors: Kangqi Liu, San Diego, CA (US); Liangming Wu, Beijing (CN); Yu Zhang, San Diego, CA (US); Chao Wei, Beijing (CN); Changlong Xu, Beijing (CN); Chenxi Hao, Beijing (CN); Min Huang, Beijing (CN); Qiaoyu Li, Beijing (CN); Hao Xu, Beijing (CN); Wei Xi, Beijing (CN); Rui Hu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/003,381

(22) PCT Filed: Aug. 26, 2021

(86) PCT No.: PCT/CN2021/114662
§ 371 (c)(1),
(2) Date: Dec. 27, 2022

(87) PCT Pub. No.: WO2022/042623
PCT Pub. Date: Mar. 3, 2022

(65) Prior Publication Data

US 2023/0275703 A1 Aug. 31, 2023

(30) Foreign Application Priority Data

Aug. 31, 2020 (WO) ................ PCT/CN2020/112432

(51) Int. Cl.
*H04L 1/1822* (2023.01)
*H04L 1/00* (2006.01)
(Continued)

(52) U.S. Cl.
CPC .......... *H04L 1/1822* (2013.01); *H04L 1/0075* (2013.01); *H04W 72/11* (2023.01); *H04W 72/232* (2023.01)

(58) Field of Classification Search
CPC ... H04L 1/1822; H04L 1/0075; H04L 1/1812; H04L 1/1896; H04L 1/0057; H04W 72/11; H04W 72/232
See application file for complete search history.

(56) References Cited

U.S. PATENT DOCUMENTS 11,304,190 B2 * 4/2022 Yang ..................... H04L 5/0094
2014/0307665 A1 10/2014 Sun et al.
(Continued)

FOREIGN PATENT DOCUMENTS

CN 103152124 A 6/2013
CN 104967469 A 10/2015
(Continued)

OTHER PUBLICATIONS

Supplementary European Search Report—EP21860458—Search Authority—The Hague—Aug. 9, 2024.
(Continued)

*Primary Examiner* — Ayaz R Sheikh
*Assistant Examiner* — Tarell A Hampton
(74) *Attorney, Agent, or Firm* — Holland & Hart LLP

(57) ABSTRACT

Methods, systems, and devices for wireless communications are described. A user equipment (UE) may receive a downlink control information (DCI) comprising a grant scheduling a data transmission for the UE, the data transmission associated with a rateless coding scheme. The UE may
(Continued)

determine to disable feedback information for the data transmission based at least in part on the rateless coding scheme and one or more of: the DCI, a resource associated with the DCI, or a semi-persistent scheduling configuration associated with the data transmission. The UE may perform or monitor for the data transmission according to the DCI and the rateless coding scheme. The UE may perform or monitor for the feedback information for the data transmission according to the determining.

30 Claims, 18 Drawing Sheets

(51) Int. Cl.
*H04W 72/11* (2023.01)
*H04W 72/232* (2023.01)

(56) References Cited

U.S. PATENT DOCUMENTS

2015/0282208 A1* 10/2015 Yi ........................ H04W 72/23 370/329
2017/0181155 A1 6/2017 Chen et al.
2017/0222753 A1 8/2017 Angelopoulos et al.
2017/0332400 A1 11/2017 Kowalski et al.
2019/0109787 A1 4/2019 Chen et al.
2019/0363843 A1* 11/2019 Gordaychik ........ H04W 72/044
2020/0044782 A1 2/2020 Vaidya et al.
2020/0044783 A1 2/2020 Vaidya et al.
2020/0044792 A1* 2/2020 Vaidya .................... H04L 47/34
2020/0275476 A1 8/2020 Yang et al.
2020/0336253 A1* 10/2020 He ........................ H04W 76/11
2020/0396760 A1* 12/2020 Yi ........................ H04W 72/23
2021/0029679 A1* 1/2021 Si .......................... H04W 72/21
2021/0105126 A1* 4/2021 Yi ......................... H04L 1/1671
2022/0007403 A1* 1/2022 Li ............................ H04L 1/08
2022/0045803 A1* 2/2022 Lin ....................... H04L 1/1822
2022/0078805 A1* 3/2022 Yoshioka .............. H04L 1/1825
2022/0158770 A1* 5/2022 Hong .................... H04L 5/0091
2022/0182982 A1* 6/2022 Yoshioka .............. H04W 72/02
2022/0239417 A1* 7/2022 Cheng ................... H04L 1/1835
2022/0263608 A1* 8/2022 Wei ....................... H04L 1/1854
2022/0264614 A1* 8/2022 Yu ......................... H04L 1/1825
2022/0286235 A1* 9/2022 Ranta-Aho ........... H04L 1/1896
2022/0286242 A1* 9/2022 Khan .................... H04W 72/23
2022/0287011 A1* 9/2022 Liu ....................... H04L 1/1822
2022/0294569 A1* 9/2022 Matsuda ............. H04W 72/044
2022/0338172 A1* 10/2022 Yoshioka .............. H04W 72/20
2022/0376844 A1* 11/2022 Muruganathan ...... H04W 72/23
2023/0188268 A1* 6/2023 Yan ....................... H04L 1/1896 370/329
2023/0217440 A1* 7/2023 Uziel .................... H04W 72/20 370/329

FOREIGN PATENT DOCUMENTS

CN 105450369 A 3/2016
CN 109392062 A 2/2019
CN 110463102 A 11/2019
CN 111278146 A 6/2020
WO WO-2015077960 A1 6/2015
WO WO-2017078237 A1 5/2017
WO 2019160737 A1 8/2019
WO WO-2020032695 A1 2/2020
WO 2020065530 A1 4/2020

OTHER PUBLICATIONS

Chao D., et al., "Forward Erasure Correction Based on Fountain Codes in Deep-Space Communications," Communications Technology Mar. 10, 2010 (Mar. 10, 2010), vol. 43, No. 03, 2010, the whole document, 4 pages.
International Search Report and Written Opinion—PCT/CN2020/112432—ISA/EPO—May 27, 2021.
International Search Report and Written Opinion—PCT/CN2021/114662—ISA/EPO—Oct. 29, 2021.
Wang Y., et al., "An H-ARQ Transmission Scheme Based on Rateless Code," 2013 Sixth International Symposium on Computational Intelligence and Design, Apr. 24, 2014 (Apr. 24, 2014), the whole document, pp. 201-204.
Qualcomm Incorporated: "Erasure Coding Evaluation Methodology", 3GPP TSG-RAN WG1 #86, R1-166375, Aug. 22-26, 2016, Gothenburg, Sweden, Aug. 13, 2016, pp. 1-8.
Qualcomm Incorporated: "Outer Code Design for URLLC and eMBB Multiplexing", 3GPP TSG-RAN WG1 #88, R1-1702641, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, 10 Pages, Feb. 12, 2017, XP051209792.
Mediatek Inc: "Remaining Issues of UL Power Control", R1-1806802, 3GPP TSG RAN WG1 RAN1 Meeting #93 Busan, South Korea, May 21-25, 2018, May 12, 2018, 14 Pages.
Qualcomm Inc: "Enhancements to Scheduling and HARQ operation for NR-U", R1-1807391, 3GPP TSG RAN WG1 Meeting #93 Busan, KoreaMay 21-May 25, 2018, May 12, 2018, 6 Pages.
Samsung: "Group DCI For Uplink HARQ-ACK Feedback", R1-1804327, 3GPP TSG RAN WG1 Meeting #92bis Sanya, China, Apr. 16-20, 2018, Apr. 7, 2018, 8 Pages.

* cited by examiner

INDICATION SCHEME FOR RATELESS CODES TRANSMISSIONS WITHOUT FEEDBACK INFORMATION

CROSS REFERENCE

The present Application is a 371 national stage filing of International PCT Application No. PCT/CN2021/114662 by Liu et al. entitled "INDICATION SCHEME FOR RATELESS CODES TRANSMISSIONS WITHOUT FEEDBACK INFORMATION," filed Aug. 26, 2021; and claims priority to International Patent Application No. PCT/CN2020/112432 by Liu et al. entitled "INDICATION SCHEME FOR RATELESS CODES TRANSMISSIONS WITHOUT FEEDBACK INFORMATION," filed Aug. 31, 2020, each of which is assigned to the assignee hereof, and each of which is expressly incorporated by reference in its entirety herein.

FIELD OF TECHNOLOGY

The following relates to wireless communications, including an indication scheme for rateless codes transmissions without feedback information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support an indication scheme for rateless code transmission without feedback information. Generally, the described techniques provide various mechanisms to signal whether a data transmission utilizing a rateless coding scheme is configured without feedback information, e.g., hybrid automatic repeat/request (HARQ) feedback information. For example, a base station may transmit a downlink control information (DCI) grant to a user equipment (UE) scheduling a data transmission (e.g., a physical downlink shared channel (PDSCH) transmission and/or a physical uplink shared channel (PUSCH) transmission). The DCI, at least in some aspects, may also indicate whether the data transmission does or does not use HARQ. For example, a dedicated radio network temporary identifier (RNTI) may be used to scramble at least a portion of the DCI to indicate the HARQ scheme (e.g., whether HARQ is disabled for the rateless coding data transmission), a new and/or modified DCI field may be used to indicate the HARQ scheme, the control resource set (CORESET)/search space (SS) set in which the DCI is transmitted may indicate the HARQ scheme, signaling configuring semi-persistent scheduling (SPS) resources (e.g., for downlink data transmissions) and/or configured grant (CG) resources (e.g., for an uplink data transmission) used for the data transmission may indicate the HARQ scheme, and/or the HARQ process number indicated in the DCI may indicate the HARQ scheme. Accordingly, the UE and base station may perform/monitor for the data transmission (e.g., depending on whether the data transmission is an uplink transmission or downlink transmission). The UE and base station may then perform/monitor for feedback information for the data transmission according to the determination of whether to enable or disable HARQ for the data transmission. For example, the feedback information may be transmitted for the non-rateless coding data transmission when HARQ is enabled or may not be transmitted for the rateless coding data transmission when HARQ is disabled.

A method of wireless communication at a UE is described. The method may include receiving a DCI including a grant scheduling a data transmission for the UE, the data transmission associated with a rateless coding scheme, determining to disable feedback information for the data transmission based on the rateless coding scheme and one or more of: the DCI, a resource associated with the DCI, or a semi-persistent scheduling configuration associated with the data transmission, performing or monitoring for the data transmission according to the DCI and the rateless coding scheme, and performing or monitoring for the feedback information for the data transmission according to the determining.

An apparatus for wireless communication at a UE is described. The apparatus may include a processor, memory coupled with the processor, and instructions stored in the memory. The instructions may be executable by the processor to cause the apparatus to receive a DCI including a grant scheduling a data transmission for the UE, the data transmission associated with a rateless coding scheme, determine to disable feedback information for the data transmission based on the rateless coding scheme and one or more of: the DCI, a resource associated with the DCI, or a semi-persistent scheduling configuration associated with the data transmission, perform or monitoring for the data transmission according to the DCI and the rateless coding scheme, and perform or monitoring for the feedback information for the data transmission according to the determining.

Another apparatus for wireless communication at a UE is described. The apparatus may include means for receiving a DCI including a grant scheduling a data transmission for the UE, the data transmission associated with a rateless coding scheme, determining to disable feedback information for the data transmission based on the rateless coding scheme and one or more of: the DCI, a resource associated with the DCI, or a semi-persistent scheduling configuration associated with the data transmission, performing or monitoring for the data transmission according to the DCI and the rateless coding scheme, and performing or monitoring for the feedback information for the data transmission according to the determining.

A non-transitory computer-readable medium storing code for wireless communication at a UE is described. The code may include instructions executable by a processor to receive a DCI including a grant scheduling a data transmission for the UE, the data transmission associated with a rateless coding scheme, determine to disable feedback information for the data transmission based on the rateless coding scheme and one or more of: the DCI, a resource associated with the DCI, or a semi-persistent scheduling configuration associated with the data transmission, perform or monitoring for the data transmission according to the DCI and the rateless coding scheme, and perform or monitoring for the feedback information for the data transmission according to the determining.

Some examples of the method, apparatuses, and non-transitory computer-readable medium described herein may further include operations, features, means, or instructions for identifying a radio network temporary identifier used to scramble a cyclic redundancy check portion of the DCI, and determining to disable feedback information for the data transmission based on the radio network temporary identifier.

Some examples of the method, apparatuses, and non-transitory computer-readable medium described herein may further include operations, features, means, or instructions for determining to disable feedback information for the data transmission based on a field indicated in the DCI.

In some examples of the method, apparatuses, and non-transitory computer-readable medium described herein, the field includes one or more bits associated with configuring the rateless coding scheme for the UE without feedback information, a modulation and coding scheme field, a new data indicator, a redundancy version field, a downlink assignment index field, a transmit power control field, a physical uplink shared channel resource indicator, a physical downlink shared channel to feedback information timing indicator field, a HARQ process number, or a combination thereof.

Some examples of the method, apparatuses, and non-transitory computer-readable medium described herein may further include operations, features, means, or instructions for receiving the DCI in a first portion of the resource associated with the DCI or a second portion of the resource associated with the DCI, and determining to disable feedback information for the data transmission based on the DCI received in the first portion of the resource or the second portion of the resource.

In some examples of the method, apparatuses, and non-transitory computer-readable medium described herein, the resource associated with the DCI includes a control resource set, a search space set, or both.

Some examples of the method, apparatuses, and non-transitory computer-readable medium described herein may further include operations, features, means, or instructions for receiving a radio resource control configuration indicating the semi-persistent scheduling configuration associated with the data transmission, and determining to disable feedback information for the data transmission based on the radio resource control configuration.

In some examples of the method, apparatuses, and non-transitory computer-readable medium described herein, the radio resource control configuration includes a semi-persistent scheduling configuration indication, a configured grant configuration indication, or both.

Some examples of the method, apparatuses, and non-transitory computer-readable medium described herein may further include operations, features, means, or instructions for identifying a HARQ process number indicated in the DCI, and determining to disable feedback information for the data transmission based on the HARQ process number.

In some examples of the method, apparatuses, and non-transitory computer-readable medium described herein, a first set of HARQ process numbers indicate that the feedback information may be disabled for the data transmission and a second set of HARQ process numbers indicate that the feedback information may be enabled for a data transmission using a non-rateless coding scheme.

Some examples of the method, apparatuses, and non-transitory computer-readable medium described herein may further include operations, features, means, or instructions for transmitting a UE capability message indicating support for performing or monitoring for the data transmission associated with rateless coding scheme where the feedback information is disabled, wherein the DCI is based at least in part on the UE capability message A method of wireless communication at a base station is described. The method may include determining to disable feedback information for a data transmission with a UE, the data transmission associated with a rateless coding scheme, transmitting a DCI including a grant scheduling the data transmission, the feedback information for the data transmission being disabled based on the rateless coding scheme and one or more of: the DCI, a resource associated with the DCI, or a semi-persistent scheduling configuration associated with the data transmission, performing or monitoring for the data transmission according to the DCI and the rateless coding scheme, and performing or monitoring for the feedback information for the data transmission according to the determining.

An apparatus for wireless communication at a base station is described. The apparatus may include a processor, memory coupled with the processor, and instructions stored in the memory. The instructions may be executable by the processor to cause the apparatus to determine to disable feedback information for a data transmission with a UE, the data transmission associated with a rateless coding scheme, transmit a DCI including a grant scheduling the data transmission, the feedback information for the data transmission being disabled based on the rateless coding scheme and one or more of: the DCI, a resource associated with the DCI, or a semi-persistent scheduling configuration associated with the data transmission, perform or monitoring for the data transmission according to the DCI and the rateless coding scheme, and perform or monitoring for the feedback information for the data transmission according to the determining.

Another apparatus for wireless communication at a base station is described. The apparatus may include means for determining to disable feedback information for a data transmission with a UE, the data transmission associated with a rateless coding scheme, transmitting a DCI including a grant scheduling the data transmission, the feedback information for the data transmission being disabled based on the rateless coding scheme and one or more of: the DCI, a resource associated with the DCI, or a semi-persistent scheduling configuration associated with the data transmission, performing or monitoring for the data transmission according to the DCI and the rateless coding scheme, and performing or monitoring for the feedback information for the data transmission according to the determining.

A non-transitory computer-readable medium storing code for wireless communication at a base station is described. The code may include instructions executable by a processor to determine to disable feedback information for a data transmission with a UE, the data transmission associated with a rateless coding scheme, transmit a DCI including a grant scheduling the data transmission, the feedback information for the data transmission being disabled based on the rateless coding scheme and one or more of: the DCI, a resource associated with the DCI, or a semi-persistent scheduling configuration associated with the data transmission, perform or monitoring for the data transmission according to the DCI and the rateless coding scheme, and perform or monitoring for the feedback information for the data transmission according to the determining.

Some examples of the method, apparatuses, and non-transitory computer-readable medium described herein may further include operations, features, means, or instructions for scrambling a cyclic redundancy check portion of the DCI using radio network temporary identifier that may be based on the determining to disable feedback information for the data transmission.

Some examples of the method, apparatuses, and non-transitory computer-readable medium described herein may further include operations, features, means, or instructions for configuring a field in the DCI to indicate to disable feedback information for the data transmission.

In some examples of the method, apparatuses, and non-transitory computer-readable medium described herein, the field includes one or more bits associated with configuring the rateless coding scheme for the UE without feedback information, a modulation and coding scheme field, a new data indicator, a redundancy version field, a downlink assignment index field, a transmit power control field, a physical uplink shared channel resource indicator, a physical downlink shared channel to feedback information timing indicator field, a HARQ process number, or a combination thereof.

Some examples of the method, apparatuses, and non-transitory computer-readable medium described herein may further include operations, features, means, or instructions for transmitting the DCI in a first portion of the resource associated with the DCI or a second portion of the resource associated with the DCI, where transmitting the DCI in the first portion or the second portion indicates to disable feedback information for the data transmission.

In some examples of the method, apparatuses, and non-transitory computer-readable medium described herein, the resource associated with the DCI includes a control resource set, a search space set, or both.

Some examples of the method, apparatuses, and non-transitory computer-readable medium described herein may further include operations, features, means, or instructions for transmitting a radio resource control configuration indicating the semi-persistent scheduling configuration associated with the data transmission, where the radio resource control configuration indicates to disable feedback information for the data transmission based on the radio resource control configuration.

In some examples of the method, apparatuses, and non-transitory computer-readable medium described herein, the radio resource control configuration includes a semi-persistent scheduling configuration indication, a configured grant configuration indication, or both.

Some examples of the method, apparatuses, and non-transitory computer-readable medium described herein may further include operations, features, means, or instructions for selecting a HARQ process number indicated in the DCI that indicates to disable feedback information for the data transmission.

In some examples of the method, apparatuses, and non-transitory computer-readable medium described herein, a first set of HARQ process numbers indicate that the feedback information may be disabled for the data transmission using the rateless coding scheme and a second set of HARQ process numbers indicate that the feedback information may be enabled for a data transmission using a non-rateless coding scheme.

Some examples of the method, apparatuses, and non-transitory computer-readable medium described herein may further include operations, features, means, or instructions for receiving a UE capability message indicating support for performing or monitoring for the data transmission associated with rateless coding scheme where the feedback information is disabled, wherein the DCI is based at least in part on the UE capability message

DETAILED DESCRIPTION

Figure 1:
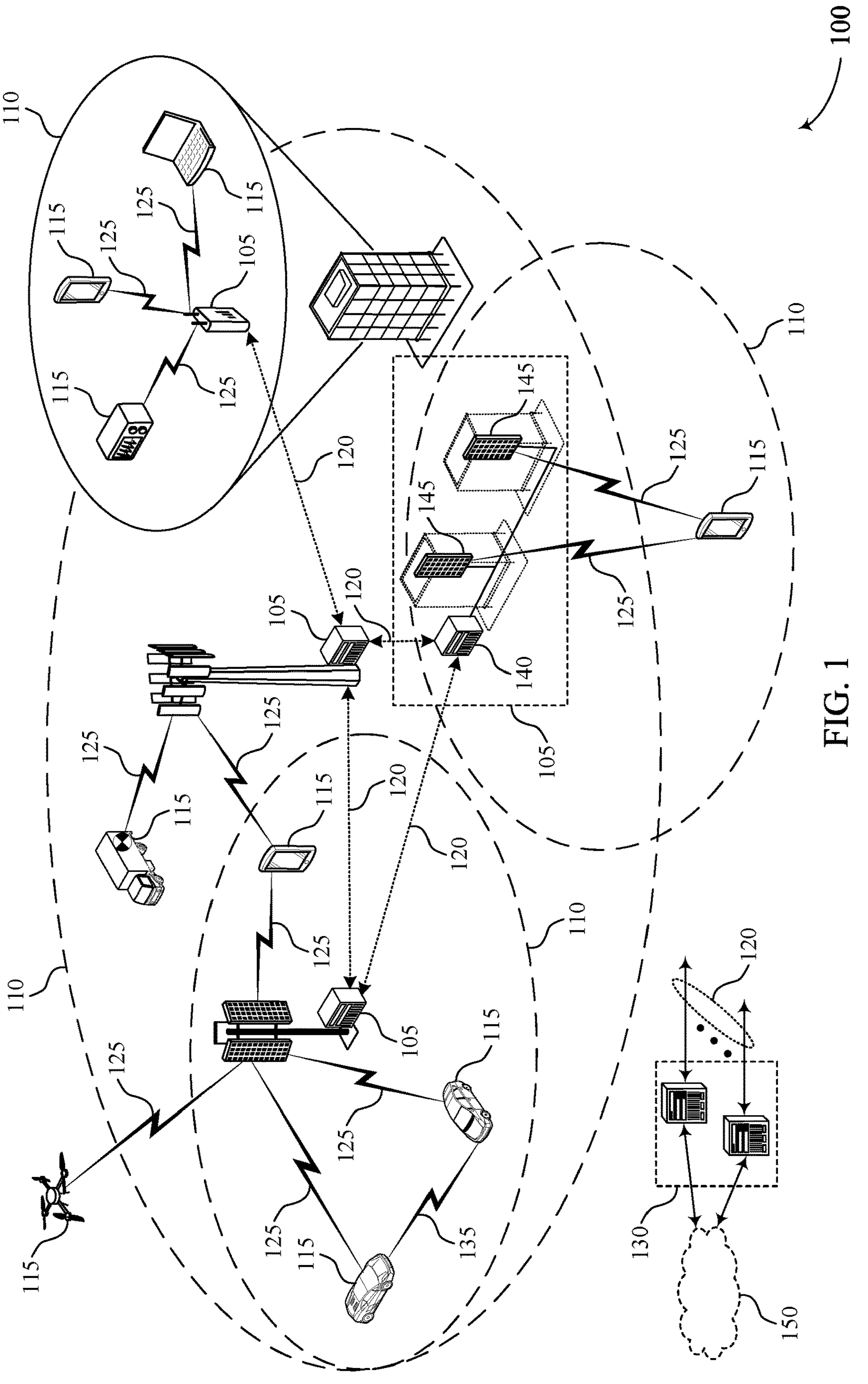
FIG. 1 illustrates an example of a system for wireless communications that supports an indication scheme for rateless code transmission without feedback information in accordance with aspects of the present disclosure.

Some wireless communications systems may use rateless coding, such as Raptor codes or other fountain codes, for physical downlink shared channel (PDSCH) and/or physical uplink shared channel (PUSCH) data transmissions. For example, the rateless coding scheme may be based on the service/message type being communicated (e.g., control plane data, user plane data, etc.). Rateless coding schemes are considered rateless coding in that the transmitted packets may be recovered at the receiver so long as the number of received packets is slightly larger than that of the source packets, regardless of which packets are received. Due to the nature of such rateless coding schemes, feedback information such as hybrid automatic repeat/request (HARQ) acknowledgment information may in some cases be unnecessary. However, some wireless communication systems may not provide a mechanism by which a downlink control information (DCI) grant scheduling the data transmission can indicate that the data transmission using the rateless coding scheme will not utilize feedback information (e.g., hybrid automatic repeat/request (HARQ) feedback information). This inability to toggle the use of HARQ feedback information may mean that HARQ feedback information is used for all data transmissions, which may be an inefficient use of resources when using a rateless coding scheme to perform the data transmission.

Aspects of the disclosure are initially described in the context of wireless communications systems. Generally, the described techniques provide various mechanisms to signal that a data transmission utilizing a rateless coding scheme is configured without feedback information, e.g., HARQ feedback information. For example, a base station may transmit a DCI grant to a user equipment (UE) scheduling a data transmission (e.g., a PDSCH transmission and/or a PUSCH transmission). The DCI, at least in some aspects, may also indicate whether the data transmission does or does not use HARQ. For example, a dedicated radio network temporary identifier (RNTI) may be used to scramble at least a portion of the DCI to indicate the HARQ scheme (e.g., that HARQ is disabled for the data transmission using rateless coding), a new and/or modified DCI field may be used to indicate the HARQ scheme, the control resource set (CORESET)/search space (SS) set in which the DCI is transmitted may indicate the HARQ scheme, signaling configuring semi-persistent scheduling (SPS) resources (e.g., for downlink data transmissions) and/or configured grant (CG) resources (e.g., for an uplink data transmission) used for the data transmission may indicate the HARQ scheme, and/or the HARQ process number indicated in the DCI may indicate the HARQ scheme. Accordingly, the UE and base station may perform/monitor for the data transmission (e.g., depending on whether the data transmission is an uplink transmission or downlink transmission). The UE and base station may then perform/monitor for feedback information for the data transmission according to the determination of whether to enable or disable HARQ for the data transmission. For example, the feedback information may be transmitted for the data transmission using non-rateless coding when HARQ is enabled or may not be transmitted for the data transmission using rateless coding when HARQ is disabled.

Aspects of the disclosure are further illustrated by and described with reference to apparatus diagrams, system diagrams, and flowcharts that relate to an indication scheme for rateless code transmission without feedback information.

FIG. 1 illustrates an example of a wireless communications system 100 that supports an indication scheme for rateless code transmission without feedback information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a DCI comprising a grant scheduling a data transmission for the UE 115, the data transmission associated with a rateless coding scheme. The UE 115 may determine to disable feedback information for the data transmission based at least in part on the rateless coding scheme and one or more of: the DCI, a resource associated with the DCI, or a semi-persistent scheduling configuration associated with the data transmission. The UE 115 may perform or monitor for the data transmission according to the DCI and the rateless coding scheme. The UE 115 may perform or monitor for the feedback information for the data transmission according to the determining.

A base station 105 may determine to disable feedback information for a data transmission with a UE 115, the data transmission associated with a rateless coding scheme. The base station 105 may transmit a DCI comprising a grant scheduling the data transmission, the feedback information for the data transmission being enabled or disabled based at least in part on the rateless coding scheme and one or more of: the DCI, a resource associated with the DCI, or a semi-persistent scheduling configuration associated with the data transmission. The base station 105 may perform or monitor for the data transmission according to the DCI and the rateless coding scheme. The base station 105 may perform or monitor for the feedback information for the data transmission according to the determining.

It is to be understood that the techniques described herein may be applied by a UE 115 and/or a base station 105. For example, aspects of the described techniques may be applied by a UE 115 and base station 105 in a downlink scenario where the base station 105 configures and performs the data transmission to the UE 115. In this downlink scenario, the base station 105 may determine and signal to UE 115 that HARQ will be disabled for the data transmission using rateless coding. Aspects of the described techniques may also be applied by a UE 115 and base station 105 in an uplink scenario where the UE 115 configures and performs (at least to some degree) the data transmission to the base station 105. In this uplink scenario, the UE 115 may determine and signal to base station 105 that HARQ will be disabled for the data transmission using rateless coding. Accordingly, although the examples discussed herein generally refer to the downlink example where the base station 105 is configuring and performing the data transmission and corresponding HARQ scheme, it is to be understood that these techniques may also be applied by the UE 115 during an uplink scenario.

Figure 2:
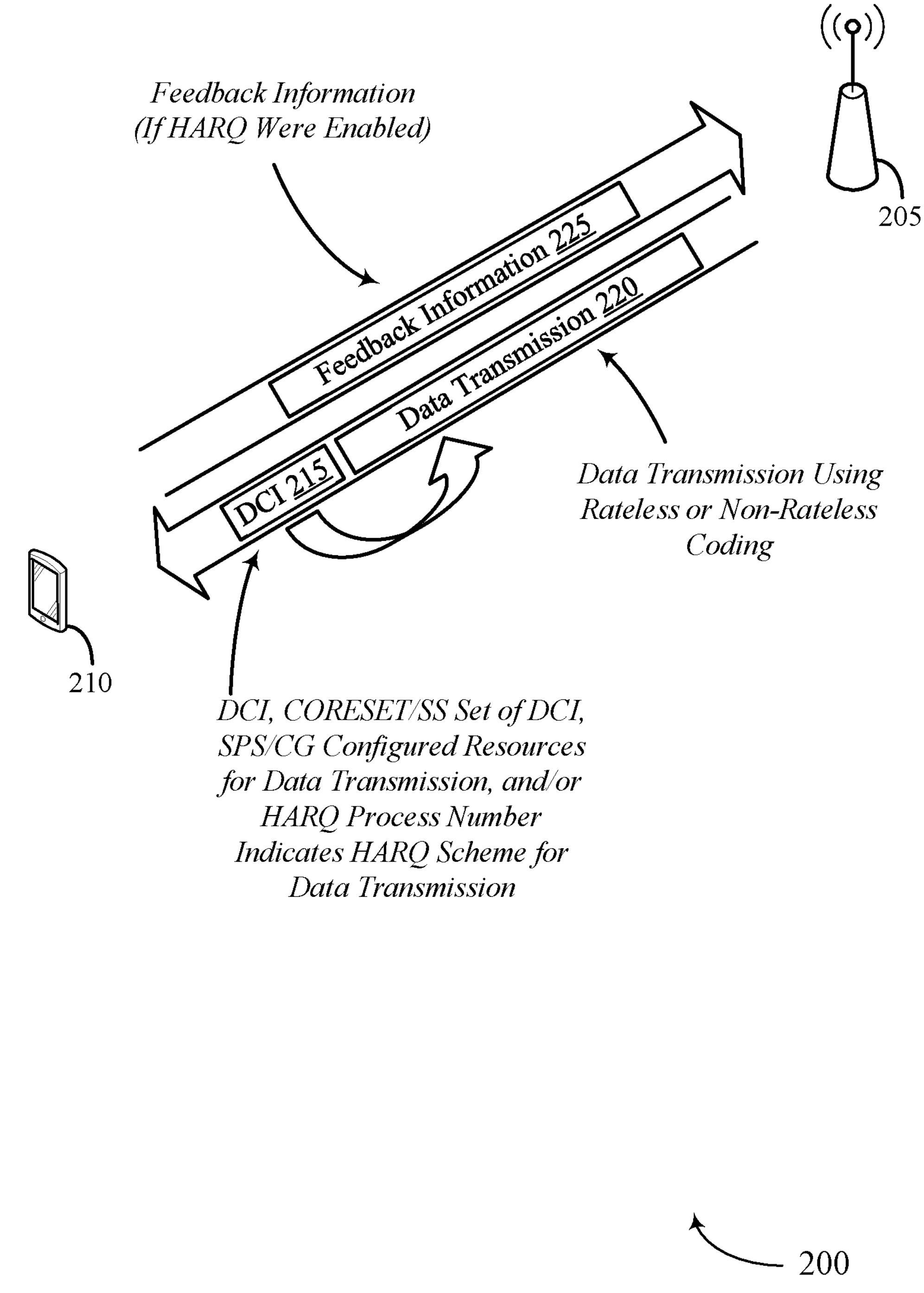
FIG. 2 illustrates an example of a wireless communication system that supports an indication scheme for rateless code transmission without feedback information in accordance with aspects of the present disclosure.

FIG. 2 illustrates an example of a wireless communications system 200 that supports an indication scheme for rateless code transmission without feedback information in accordance with aspects of the present disclosure. In some examples, wireless communications system 200 may implement aspects of wireless communications system 100. Aspects of the described techniques may be implemented at or by base station 205 and/or UE 210, which may be examples of the corresponding devices described herein.

In some aspects, base station 205 may be configured or otherwise acting as a transmitting device performing a data transmission to UE 210 (e.g., a downlink transmission), which may be configured or otherwise acting as a receiving device in this scenario. However, it is to be understood that UE 210 may implement various aspects of the described techniques when acting as or otherwise configured as the transmitting device performing a data transmission to base station 205 (e.g., an uplink transmission), which would be configured or otherwise acting as the receiving device in this scenario. In some examples, such wireless transmissions may be performed by base station 205 to another base station and/or by UE 210 to another UE. Aspects of the described techniques, however, are not limited to the downlink transmission scenario, but may, instead, be equally applicable to the uplink transmission scenario.

Wireless communications system 200 may utilize fountain codes, which are rateless codes in that the number of encoded packets to be transmitted is potentially limitless. For example, the transmitted packets may be recovered at the receiver side so long as the number of received packets is slightly larger than the number of source packets (no matter which packets are received and successfully decoded). Examples of such rateless codes include Luby transform (LT) codes, raptor codes (an enhanced code based on variations of low-density parity-check (LDPC) and LT codes), and the like.

Fountain codes are also referred to as network codes because they are applied to the network/application layer (e.g., for MBMS, IAB, and the like). At the receiving side, each encoded symbol would either be decoded correctly or discarded (e.g., the encoded packet(s) transmitted during a symbol). This approach permits a block number (e.g., a source block number (SBN)) and/or a symbol identifier (e.g., an electronic symbol identifier (ESI)) associated with the packet(s) to be added as a header file to the encoded symbols. The SBN generally corresponds to an integer identifier for the source block (e.g., the column of the original generator matrix) that the encoded symbols within the packet relate to. The ESI generally corresponds to an integer identifier for the encoding symbols within the packet. Each encoded packet may include the SBN (e.g., the first 16 bits), the ESI (e.g., the last 16 bits), and the encoding symbol(s). Based on the SBN and ESI, the transmitting device and receiving device may determine which source symbols (e.g., which column of the original generator matrix) were selected to generate the encoded symbol.

Accordingly, fountain codes are rateless codes with an unlimited number of columns in the original generator matrix generated by the transmitting device. For example, the transmitting device may have K symbols for transmission to the receiving device. The original generator matrix may therefore be generated with K rows (corresponding to the K symbols) and, as the fountain code is a rateless code, a potentially infinite number of columns. The number of transmitted packets may correspond to the formula:

$$p_j = \sum_{k=1}^{K} s_k G_{kj}$$

For a conventional ARQ scheme, the original generator matrix may begin with the unit matrix.

The recovered packets (e.g., the received packets) may correspond to the formula:

$$r_k = \sum_{n=1}^{N} P_n\left(G'^{-1}_{nk}\right)$$

The condition or scenario for the receiving device to recover the packets may include G' according to the received packets being invertible or the rank of G' being K. A design rule for the original generator matrix is that G' is invertible with minimum N.

With respect to LT codes, efficient methods may be utilized to realize the function of fountain codes. For example, the encoding process for each encoding symbol may include the transmitting device randomly choosing a degree $d_i$ from a degree distribution and randomly choosing $d_i$ distinct source symbols with uniform distribution and performing an exclusive or (XOR) function on them.

At the receiving device, the decoding process may include a belief propagation technique, gaussian elimination process, and the like. For example, the receiving device may find an encoding symbol $t_j$ that is connected to only one source symbol $S_i$. The receiving device may set $S_i$ to $t_j$, XOR $S_i$ to all encoding symbols that are connected to $S_i$, and remove all edges connected to the source symbol $S_i$. The receiving device may repeat this until all $S_i$ are determined. If there are no encoding symbols that are connected to only one source symbol, then the decoding process fails.

Raptor codes generally reduce the encoding and decoding complexity of LT codes by reducing the average degree (e.g., LDPC plus weak LT code with a small averaging degree, such as three). The precoding process may include generating some redundant symbols, such as S LDPC symbols (each source symbol will appear three times in all LDPC symbols) and H half symbols (each encoding symbol containing ceiling (H/2) source symbols). The encoding process for each encoding symbol may include randomly choosing a degree $d_i$ from a degree distribution, e.g., may choose $d_i$ distinct source symbols and XOR them. The number of redundant symbols may be based on the first K intermediate symbols.

The data partitioning and encoding process may be based on the different layers of the protocol stack of the transmitting device. For example, $N_d$ bits of data may be received at the PDCP layer. The $N_d$ bits may be partitioned into 1 packets with $N_b$ bits per packet (e.g., each of $S_0$, $S_1$, $S_3$, . . . , $S_{l-2}$, $S_{l-1}$ may correspond to an $N_b$-bit packet). In the RLC layer, an erasure correction code (such as fountain codes/rateless coding) may be used to encode across the l packets to generate a stream of L encoded packets (e.g., packets of $P_0$, $P_1$, $P_2$, $P_3$, . . . , $P_{L-1}$). At the MAC/physical layer, each packet may consist of $N_S$ symbols after error-correction, coding and modulation (e.g., each packet P may include $X_0$, $X_1$, $X_2$, . . . , $X_{N_S-1}$). Each information symbol may include Q bits (e.g., $N_b \leq N_S Q$).

Such rateless coding techniques may be configured without feedback information (e.g., without HARQ feedback for the corresponding data transmission). The feedback information for a data transmission using rateless coding may be configured for a UE (e.g., in a downlink scenario) and/or for a base station (e.g., in an uplink scenario). The feedback information for a data transmission may be based, at least in some aspects, on the service/message type (e.g., on the service/message type of the data transmission). As one non-limiting example, control plane data transmission(s) using non-rateless coding (e.g., such as RRC signaling) may be configured with feedback information enabled, whereas user plane data transmissions using rateless coding (e.g., such as latency tolerant services) may be configured with feedback information disabled. However, wireless communication systems typically do not provide a mechanism to signal or otherwise indicate whether the feedback information (e.g., HARQ feedback) for a data transmission using rateless coding is disabled.

Accordingly, aspects of the described techniques provide various mechanisms that may be leveraged to signal or otherwise convey an indication (e.g., explicit and/or implicit) that the feedback information is disabled for a data transmission using rateless coding and/or enabled for a data transmission using non-rateless coding. Generally, FIG. 2 illustrates a downlink scenario example where base station 205 transmits a DCI 215 to UE 210 scheduling data transmission 220, with data transmission 220 utilizing a rateless coding scheme. In some aspects, UE 210 may determine that feedback information (e.g., HARQ feedback information) for data transmission 220 is disabled based, at least in some aspects, on DCI 215. When feedback information is enabled, UE 210 may attempt to receive and decode a data transmission that uses non-rateless coding (e.g., in the example where data transmission 220 uses non-rateless coding) and transmit feedback information 225 to base station 205 based on the results. For example, feedback information 225 may include acknowledgement (ACK) information for the non-rateless coded data transmission when UE 210 is able to successfully receive and decode the data transmission, or negative-acknowledgement (NACK) information if UE 210 is unable to successfully receive and decode the data transmission. When disabled, UE 210 may attempt to receive and decode data transmission 220 that uses rateless coding, but may not transmit ACK/NACK information for data transmission 220 (e.g., performing or monitoring for the feedback information 225 may include UE 210 refraining from transmitting feedback information 225).

As discussed, UE 210 may determine that feedback information 225 (e.g., HARQ information, such as ACK/NACK information) is disabled for data transmission 220 using rateless coding based, at least in part, on DCI 215. More particularly, base station 205 may select or otherwise determine to disable feedback information 225 for data transmission 220 that uses rateless coding. Base station 205 may, therefore, utilize various aspects of the described techniques to transmit or otherwise convey an indication that feedback information 225 is disabled for data transmission 220 that uses rateless coding. DCI 215 may be utilized, at least to some degree, by base station 205 to transmit or otherwise convey such indication. For example, a dedicated RNTI may be used to scramble DCI 215, a new field may be added and/or an existing field of DCI 215 may be modified/repurposed to be used, a CORESET/SS set used to convey DCI 215 may be used (e.g., separate CORESET and/or SS set may be configured for rateless coding data transmissions without HARQ), RRC configuration signaling configuring SPS/CG resources for data transmission 220 that are activated by DCI 215 may be used, HARQ process number(s) indicated in DCI 215 may be used, and the like, to convey such indication.

More particular, in one example UE 210 may determine that feedback information 225 is disabled based on a dedicated RNTI that was used by base station 205 to scramble a CRC portion of DCI 215. That is, one or more RNTI(s) may be set aside or otherwise associated with data transmissions using rateless coding when feedback information 225 is disabled. Base station 205 selecting a particular or dedicated RNTI to scramble the CRC portion of DCI 215 may carry or otherwise convey the indication that data transmission 220 that uses rateless coding is configured without feedback information 225. In one non-limiting example, if the dedicated RNTI is blindly detected by UE 210, then rateless codes without HARQ may be indicated (e.g., feedback information 225 is disabled for data transmission 220). The dedicated RNTI may be used to scramble other portions, or all of DCI 215 in some examples. Accordingly, UE 210 may determine to disable feedback information 225 for data transmission 220 that uses rateless coding based on the RNTI.

In another example, one or more fields carried or otherwise conveyed in DCI 215 may be used to indicate that feedback information 225 is disabled for data transmission 220 using rateless coding. For example, a new field having one or more bits may be added to DCI 215 to indicate to UE 210 the rateless codes without HARQ is configured for data transmission 220. That is, the one or more bits conveyed in DCI 215 may be associated with configuring the rateless coding scheme for UE 210 without feedback information 225.

Additionally, or alternatively, existing fields in DCI 215 may be used to carry or otherwise convey the indication that feedback information 225 is disabled for data transmission 220 using rateless coding. For example, an MCS field may be used to convey the indication (e.g., the MCS field may include five bits, which can be configured as 0 bit if MCS is not changed, wherein UE 210 may reuse the previously configured MCS). In another example, a new data indicator (NDI) may be used to convey the indication that feedback information 225 is disabled for data transmission 220 using rateless coding. For example, the NDI field can be configured as a 0 bit for a rateless code transmission scheme without HARQ (e.g., feedback information 225 is disabled) or as a 1 bit for a non-rateless code transmission scheme with HARQ (e.g., feedback information 225 is enabled when data transmission 220 uses non-rateless coding).

In another example, the redundancy version (RV) field of DCI 215 may be used to convey the indication that feedback information 225 is disabled for data transmission 220 using rateless coding. For example, the RV field can be configured as a 0 bit for a rateless code transmission scheme without HARQ (e.g., feedback information 225 is disabled) or as a 1 bit for a non-rateless code transmission scheme with HARQ (e.g., feedback information 225 is enabled when data transmission 220 uses non-rateless coding). In another example, the downlink assignment index (DAI) field of DCI 215 may be used to convey the indication that feedback information 225 is disabled for data transmission 220 using rateless coding. That is, the DAI field of DCI 215 may include one or more bits used as a counter DAI (e.g., the DAI field may be set to a first value to indicate that feedback information 225 is enabled for a non-rateless coding data transmission or to a second value to indicate that feedback information 225 is disabled for data transmission 220 using rateless coding).

In another example, the transmit power control (TPC) field/command of DCI 215 may be used to convey the indication that feedback information 225 is disabled for data transmission 220 using rateless coding. The TPC command may be for a scheduled PUCCH resource, such as the uplink resource used to transmit or otherwise convey feedback information 225. In one example, the TPC command may be configured as a 0 bit if no PUCCH is scheduled, which may indicate that feedback information 225 is disabled for data transmission 220 using rateless coding. Conversely, the TPC command may be configured as a 1 bit if PUCCH is scheduled, which may indicate that feedback information 225 is enabled for a data transmission using non-rateless coding.

In another example, the PUCCH resource indicator of DCI 215 may be used to convey the indication that feedback information 225 is enabled or disabled for data transmission 220 using rateless coding. For example, the PUCCH resource indicator may include three bits that can be configured as a 0 bit if no PUCCH is scheduled (e.g., if feedback information 225 is disabled for data transmission 220 using rateless coding). In another example, the PDSCH-to-HARQ feedback timing indicator of DCI 215 may be used to convey the indication that feedback information 225 is disabled for data transmission 220 using rateless coding. For example, the PDSCH-to-HARQ feedback timing indicator may include three bits that can be configured as a 0 bit if no HARQ feedback is scheduled (e.g., if feedback information 225 is disabled for data transmission 220 using rateless coding).

In some examples, DCI 215 may be a downlink grant (e.g., a DCI format 1_*) or an uplink grant (e.g., DCI format 0_*). Aspects of the described techniques may be applicable for either scenario (e.g., for either DCI format). For example, a new field may be added to the uplink grant (e.g., DCI format 0_*) to indicate to UE 210 that data transmission 220 is configured with feedback information 225 disabled for a data transmission using rateless coding. Similarly, one or more existing fields in an uplink grant may also be used to convey the indication, e.g., such as the MCS field, and NDI field, and RV field, etc.

In another example, the control channel resources (e.g., CORESET and/or SS set) associated with DCI 215 may convey the indication that feedback information 225 is disabled for data transmission 220 using rateless coding. For example, UE 210 may be configured with one or more CORESETs and/or SS set(s) in which to monitor for DCI 215. If DCI 215 is transmitted in a first portion of the control channel resources (e.g., a particular CORESET and/or SS set), this may convey an indication that feedback information 225 is disabled for data transmission 220 using rateless coding. Accordingly, base station 205 may use RRC signaling messages to configure UE specific SS set and/or CORESET, which may be partitioned into two or more parts/portions. If DCI 215 is transmitted in the first part/portion, then the conventional transmission scheme may be configured (e.g., feedback information 225 is enabled for data transmission 220 using non-rateless coding). Conversely, if DCI 215 is transmitted in the second part/portion, then the rateless coding transmission scheme without HARQ may be configured (e.g., feedback information 225 is disabled for data transmission 220 using rateless coding).

In some aspects, RRC configuration signaling configuring SPS resources and/or CG resources associated with the data transmission may be used to convey the indication of whether the corresponding data transmission is enabled or disabled with feedback information 225. That is, base station 205 may transmit or otherwise convey RRC configuration signaling to UE 210 that configures SPS (e.g., semi-persistent downlink resources) and/or CG resources (e.g., semi-persistent uplink resources) to be used for the data transmission. The RRC configuration signaling may be configured to indicate that the data transmission using rateless coding that is scheduled using the SPS for/CG resources will have HARQ feedback information disabled. The RRC configuration signaling may be configured to indicate that the data transmission using non-rateless coding that is scheduled using the SPS for/CG resources will have HARQ feedback information enabled.

In another example, the HARQ process number carried or otherwise conveyed in DCI 215 may be used to convey the indication that feedback information 225 is disabled for data transmission 220 using rateless coding. That is, one or more HARQ process numbers may be reserved for rateless coding-based data transmissions. A first set of HARQ process numbers may be associated with feedback information 225 being enabled for data transmission 220 using non-rateless coding and a second set of HARQ process numbers may be associated with feedback information 225 being disabled for data transmission 220 using rateless coding. In one example, HARQ process number 0000 may be associated with rateless coding transmissions without feedback information 225 being enabled, and the NDI field may be set to 1 or configured as a 0 bit. In this example, the NDI may also be reused to indicate whether it contains systematic packets. In this example, HARQ process numbers 0001-1111 may refer to conventional transmission schemes (e.g., with feedback information 225 being enabled for a data transmission using non-rateless coding), with the NDI field indicating whether or not the transmission is a retransmission. In another example, HARQ process numbers 0000-0001 may be associated with rateless transmissions without feedback information 225 being enabled, and the NDI field may be set to 1 or configured as a 0 bit. In this example, the NDI may also be reused to indicate whether it contains systematic packets. In this example, HARQ process numbers 0010-1111 may be associated with conventional transmission schemes (e.g., with feedback information 225 being enabled for a data transmission using non-rateless coding), with the NDI field indicating whether or not the transmission is a retransmission.

In some examples, DCI 215 may be based on capability reporting received from UE 210. That is, UE 210 may identify or otherwise determine whether it supports data transmissions using rateless coding in the situation where HARQ feedback is enabled and/or disabled. UE 210 may transmit, convey, or otherwise provide (and base station 205 may receive or otherwise obtain) a UE capability message. The UE capability message may carry (e.g., explicitly using one or more bits, fields, etc.) or otherwise convey (e.g., implicitly using linked or otherwise associated bits, fields, etc.) an indication of whether or not UE 205 supports participating in rateless coding data transmissions with HARQ feedback disabled.

For example, UE 210 may transmit the UE capability message indicating no support for performing or monitoring for the data transmission associated with rateless coding where the feedback information is disabled. Or, UE 210 may transmit the UE capability message indicating support for performing or monitoring for the data transmission associated with rateless coding where the feedback information is disabled.

In some aspects, the DCI 215 may be based, at least to some degree, on the UE capability message (e.g., whether or not UE 210 support rateless coding data transmissions without HARQ feedback). If the UE supports the rateless codes without feedback information, the network (e.g., base station 205) may schedule such rateless code transmissions without feedback information and/or may schedule a legacy transmission scheme for the UE (e.g., a data transmission using a non-rateless coding scheme). If the UE does not support the rateless code transmission without feedback information, the network (e.g., base station 205) may schedule the legacy transmission schemes for the data transmissions.

Accordingly, UE 210 may receive DCI 215 scheduling data transmission 220 that uses rateless coding. Based on DCI 215, the CORESET/SS set of DCI 215, SPS/CG configured resources for data transmission 220 and activated by DCI 215, the HARQ process number, and the like, UE 210 may determine that feedback information 225 is disabled for data transmission 220 that uses rateless coding. If feedback information were enabled (e.g., when data transmission 220 uses non-rateless coding), UE 210 may transmit or otherwise convey feedback information 225 to provide ACK/NACK information for data transmission 220 using non-rateless coding to base station 205. When disabled (e.g., when data transmission 220 uses rateless coding), UE 210 may receive and decode data transmission 220, but may refrain from transmitting feedback information 225 to base station 205.

Figure 3:
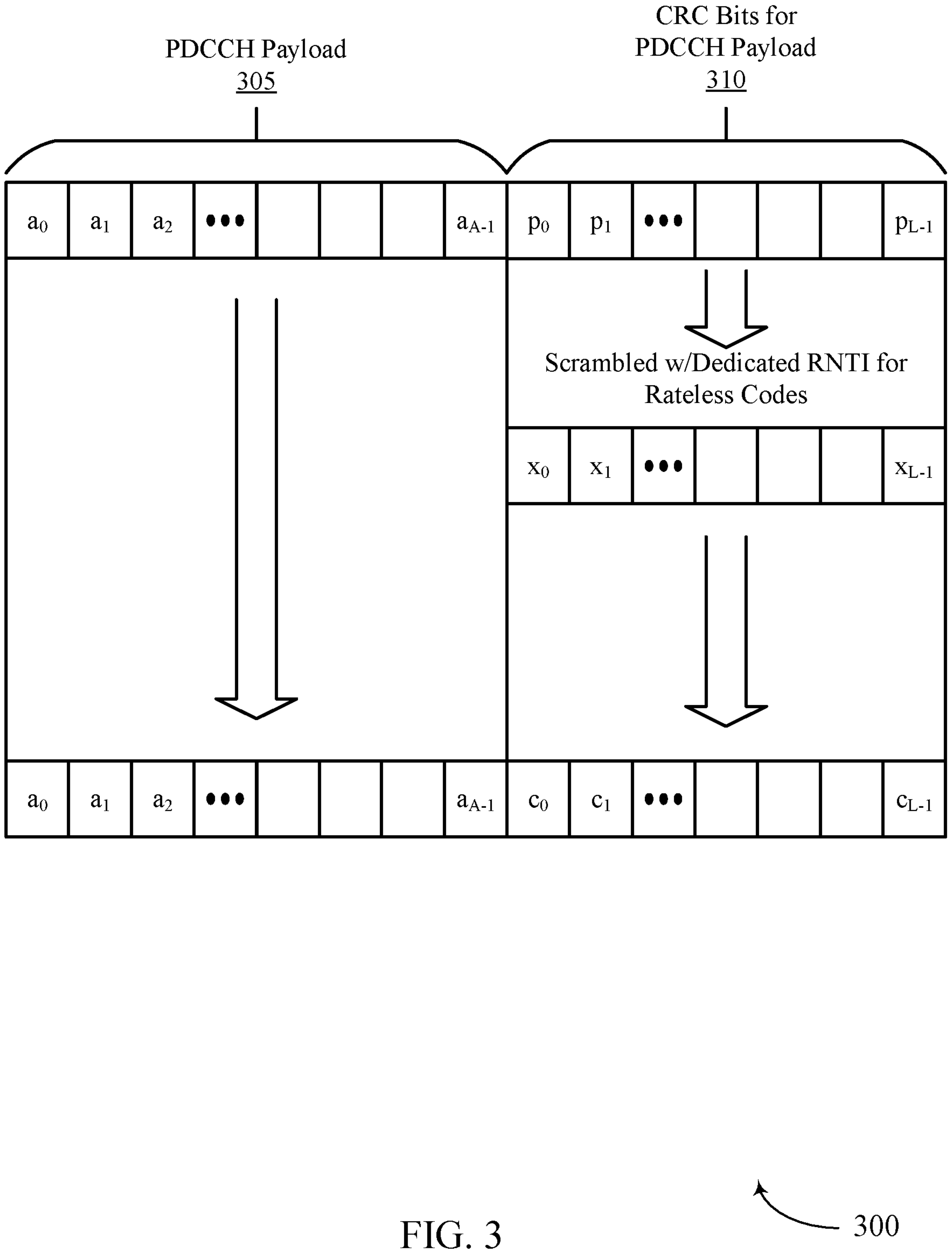
FIG. 3 illustrates an example of a downlink control information configuration that supports an indication scheme for rateless code transmission without feedback information in accordance with aspects of the present disclosure.

FIG. 3 illustrates an example of a DCI configuration 300 that supports an indication scheme for rateless code transmission without feedback information in accordance with aspects of the present disclosure. In some examples, DCI configuration 300 may implement aspects of wireless communications systems 100 and/or 200. Aspects of DCI configuration 300 may be implemented at or implemented by a UE and/or base station, which may be examples of the corresponding devices described herein.

As discussed above, aspects of the described techniques provide various mechanisms that may be leveraged to signal or otherwise convey an indication (e.g., explicit and/or implicit) that the feedback information is disabled for a data transmission that uses a rateless coding scheme. Generally, a base station may transmit a DCI that includes the PDCCH payload 305 and CRC bits 310 to a UE scheduling a data transmission utilizing a rateless coding scheme (e.g., in a downlink scenario). It is to be understood that these techniques may be applicable in an uplink scenario where the UE schedules and performs the data transmission to the base station (and/or another UE) utilizing rateless coding and indicates that the feedback information is disabled. Continuing with the downlink scenario example, the UE may determine that feedback information (e.g., HARQ feedback information) for the data transmission using rateless coding is disabled based, at least in some aspects, on the DCI. When enabled (e.g., when the data transmission uses non-rateless coding), the UE may attempt to receive and decode the data transmission and transmit feedback information to the base station based on the results. For example, the feedback information may include ACK information for the data transmission when the UE is able to successfully receive and decode the data transmission, or NACK information if the UE is unable to successfully receive and decode the data transmission. When disabled (e.g., when the data transmission uses rateless coding), the UE may attempt to receive and decode the data transmission that uses the rateless coding scheme, but may not transmit ACK/NACK information for the data transmission (e.g., performing or monitoring for the feedback information may include the UE refraining from transmitting the feedback information).

Accordingly, the UE may determine that the feedback information (e.g., HARQ feedback information, such as ACK/NACK information) is disabled for the data transmission using rateless coding based, at least in part, on the DCI that schedules the data transmission. The base station may select or otherwise determine to disable feedback information for the data transmission that uses rateless coding. The base station may, therefore, utilize various aspects of the described techniques to transmit or otherwise convey an indication that the feedback information is disabled for the data transmission that uses the rateless coding scheme. The scheduling DCI may be utilized, at least to some degree, by the base station to transmit or otherwise convey such indication. DCI configuration 300 illustrates one non-limiting example of a dedicated RNTI being used to scramble at least a portion of the scheduling DCI to convey such indication.

For example, the UE may determine that the feedback information is disabled based on a dedicated RNTI that was used by the base station to scramble a CRC portion of the scheduling DCI. That is, a first one or more RNTI(s) may be set aside or otherwise associated with data transmissions using non-rateless coding when feedback information is enabled and a second one or more RNTI(s) may be set aside or otherwise associated with data transmissions using rateless coding when feedback information is disabled. The base station selecting a particular or dedicated RNTI to scramble the CRC portion of the scheduling DCI may carry or otherwise convey the indication that the data transmission that uses rateless coding is configured without feedback information.

More particularly, the scheduling DCI may include a PDCCH payload 305 including bits $a_0$ to $a_{A-1}$. These bits may be used to carry or otherwise convey information associated with or otherwise activating resources for the data transmission that uses the rateless coding scheme. The base station may add CRC bits 310 to the PDCCH payload 305, which may include bits $p_0$ to $p_{L-1}$. The CRC bits 310 may generally be used as an error check technology. The base station may determine that the data transmission using the rateless coding scheme is to be disabled, and select the RNTI used to scramble the CRC bits 310 accordingly. For example, the base station may select a first RNTI from a first set of RNTIs associated with the feedback information being enabled for a data transmission using non-rateless coding or may select a second RNTI from a second set of RNTIs associated with the feedback information being disabled for a data transmission using rateless coding. The base station may scramble the CRC bits 310 (e.g., bits $p_0$ to $p_{L-1}$.) using the RNTI to generate or otherwise obtain bits $X_0$ to $X_{L-1}$. After further processing/modification, the base station may transmit the scheduling DCI including PDCCH payload 305 and the RNTI scrambled CRC bits $C_0$ to $C_{L-1}$.

It is to be understood that the dedicated RNTI may be used to scramble other portions, or all of the scheduling DCI in some examples. Accordingly, the UE may determine that feedback information for the data transmission that uses rateless coding is disabled based on the RNTI.

Figure 4A:
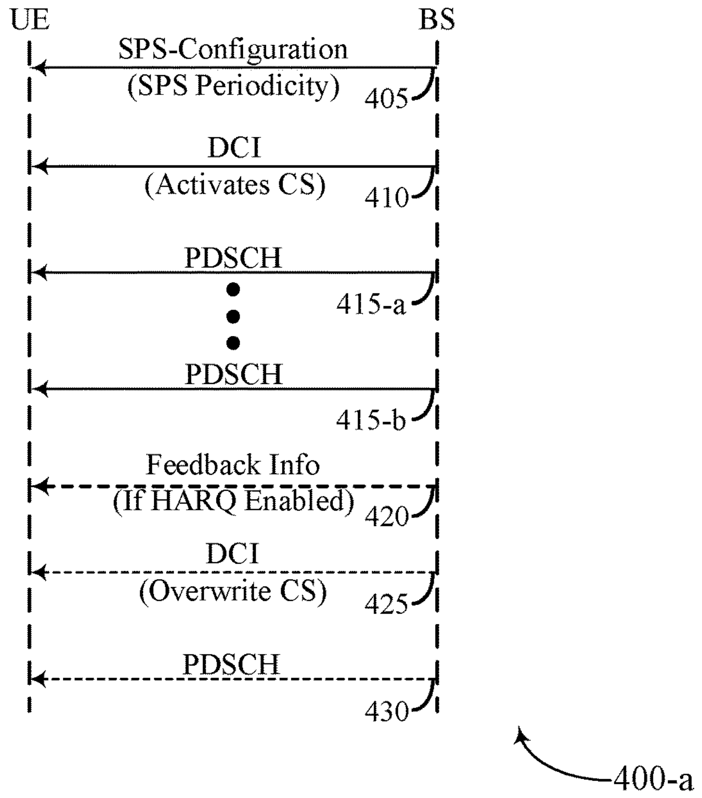
FIGS. 4A and 4B illustrate example processes that supports an indication scheme for rateless code transmission without feedback information in accordance with aspects of the present disclosure.
Figure 4B:
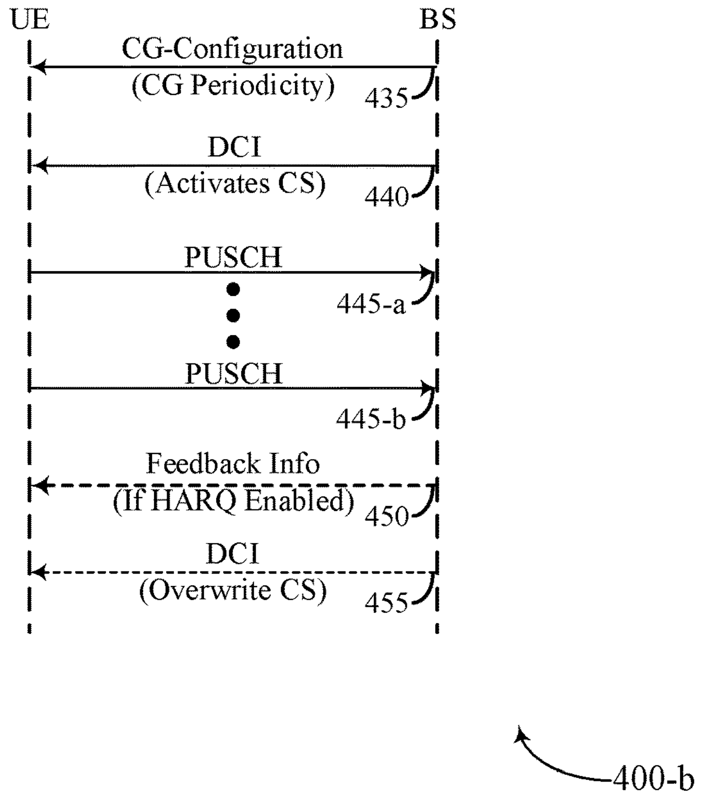

FIGS. 4A and 4B illustrate examples of processes 400 that supports an indication scheme for rateless code transmission without feedback information in accordance with aspects of the present disclosure. In some examples, process 400 may implement aspects of wireless communications systems 100 and/or 200. Aspects of process 400 may be implemented by or implemented at a UE and/or base station (BS), which may be examples of the corresponding devices described herein. Generally, process 400-*a* of FIG. 4A illustrates a downlink example and process 400-*b* of FIG. 4B illustrates an uplink example, either of which may be utilize aspects of the described techniques.

As discussed above, aspects of the described techniques provide various mechanisms that may be leveraged to signal or otherwise convey an indication (e.g., explicit and/or implicit) that the feedback information is disabled (e.g., not configured) for a data transmission that uses a rateless coding scheme. Generally, a base station may transmit a DCI scheduling a data transmission utilizing a rateless coding scheme (e.g., in a downlink scenario). It is to be understood that these techniques may be applicable in an uplink scenario where the UE schedules and performs the data transmission to the base station (and/or another UE) utilizing rateless coding and indicates that the feedback information is disabled. Continuing with the downlink scenario example, the UE may determine that feedback information (e.g., HARQ feedback information) for the data transmission using rateless coding is disabled based, at least in some aspects, on the DCI. When enabled (e.g., when the data transmission uses non-rateless coding), the UE may attempt to receive and decode the data transmission and transmit feedback information to the base station based on the results. For example, the feedback information may include ACK information for the data transmission when the UE is able to successfully receive and decode the data transmission, or NACK information if the UE is unable to successfully receive and decode the data transmission. When disabled (e.g., when the data transmission uses rateless coding), the UE may attempt to receive and decode the data transmission that uses the rateless coding scheme, but may not transmit ACK/NACK information for the data transmission (e.g., performing or monitoring for the feedback information may include the UE refraining from transmitting the feedback information).

Accordingly, the UE may determine that the feedback information (e.g., HARQ feedback information, such as ACK/NACK information) is disabled for the data transmission using rateless coding based, at least in part, on the DCI that schedules the data transmission. The base station may select or otherwise determine to disable feedback information for the data transmission that uses rateless coding. The base station may, therefore, utilize various aspects of the described techniques to transmit or otherwise convey an indication that the feedback information is disabled for the data transmission that uses the rateless coding scheme. The scheduling DCI may be utilized, at least to some degree, by the base station to transmit or otherwise convey such indication.

For example, the UE may determine that the feedback information is disabled based on RRC configuration signaling configuring SPS resources (in the downlink example) and/or CG resources (in the uplink example) associated with the data transmission that is activated by the scheduling DCI. That is, the base station may transmit or otherwise convey RRC configuration signaling to the UE that configures SPS (e.g., semi-persistent downlink resources) and/or CG resources (e.g., semi-persistent uplink resources) to be used for the data transmission. The RRC configuration signaling may be configured to indicate that the data transmission using rateless coding that is scheduled using the SPS for/CG resources will have HARQ feedback information disabled.

More particularly and with reference to the downlink example illustrated in process 400-*a* of FIG. 4A, at 405 the base station may transmit RRC signaling to the UE. The RRC signaling may carry or otherwise convey an indication of an SPS-Config field/bit(s) that identifies various aspects of the semi-persistent downlink resources being configured by the RRC signaling. For example, the RRC signaling may indicate the time, frequency, spatial, and/or code resources being configured, the periodicity of such resources, and the like. The RRC signaling (e.g., the SPS-Config field/bits) may also carry or otherwise convey an indication that a data transmission using rateless coding on such resources is configured with feedback information disabled.

That is, the network may configure the UE with multiple SPS configurations (SPS-Config) (e.g., a set of downlink SPS configurations). Some SPS configuration(s) (e.g., a first subset) may correspond to or otherwise be associated with the rateless code data transmissions without feedback information. Other SPS configuration(s) (e.g., a second subset) may correspond to or otherwise be associated with legacy data transmission schemes (e.g., with non-rateless coding). The network may provide or otherwise indicate an index of one or more of the downlink SPS configurations to the UE. The network may provide the indication using an SPS configuration index (SPS-ConfigIndex) information element (IE) and/or using a DCI format 1 activating the configured scheduling (CS) (e.g., the SPS configuration).

Subsequently, at 410 the base station may transmit a scheduling DCI to the UE that activates the configured SPS resources for a data transmission using a rateless coding scheme. The UE may determine, based at least in part on the SPS resources configured by the RRC signaling, that the SPS resources activated by the scheduling DCI are configured with feedback information disabled for the data transmission. At 415, the UE may monitor for the data transmission that uses the rateless coding scheme. The data transmission may span one or more PDSCH transmissions.

If feedback information is enabled for the data transmission that uses non-rateless coding, at 420 the UE may transmit or otherwise convey feedback information (e.g., HARQ feedback information) to the base station providing ACK/NACK information for the data transmission. If the feedback information is disabled for a data transmission using rateless coding, the UE may refrain from transmitting the feedback information to the base station. Subsequently, at 425 another DCI may be transmitted by the base station that overwrites previously configured SPS resources and, instead, schedules a second data transmission performed at 430.

In an uplink scenario and with reference to the uplink example illustrated in process 400-*b* of FIG. 4B, at 435 the base station may transmit RRC signaling to the UE. The RRC signaling may carry or otherwise convey an indication of a ConfiguredGrantConfig field/bit(s) that identifies various aspects of the CG uplink resources being configured by the RRC signaling. For example, the RRC signaling may indicate the time, frequency, spatial, and/or code resources being configured, the periodicity of such resources, and the like. The RRC signaling (e.g., the ConfiguredGrantConfig field/bit(s)) may also carry or otherwise convey an indication that a data transmission using rateless coding activated on such resources is configured with feedback information disabled.

That is, the network may configure the UE with multiple CG configurations (ConfiguredGrantConfig) (e.g., a set of uplink CG configurations). Some CG configuration(s) (e.g., a first subset) may correspond to or otherwise be associated with the rateless code data transmissions without feedback information. Other CG configuration(s) (e.g., a second subset) may correspond to or otherwise be associated with legacy data transmission schemes (e.g., with non-rateless coding). The network may provide or otherwise indicate an index of one or more of the uplink CG configurations to the UE. The network may provide the indication using a CG configuration index (ConfiguredGrantConfigIndex) IE and/or using a DCI format 0 activating the CS (e.g., the CG configuration). Subsequently, at 440 the base station may transmit a scheduling DCI to the UE that activates the configured CG resources for a data transmission using a rateless coding scheme. The UE may determine, based at least in part on the CG resources configured by the RRC signaling, that the CG resources activated by the scheduling DCI are configured with feedback information disabled for the data transmission. At 445, the UE may perform the data transmission (e.g., transmit) that uses the rateless coding scheme. The data transmission may span one or more PUSCH transmissions.

If feedback information is enabled for the data transmission using non-rateless coding, at 450 the base station may transmit or otherwise convey feedback information (e.g., HARQ feedback information) to the UE providing ACK/NACK information for the data transmission. If the feedback information is disabled for the data transmission using rateless coding, the UE may refrain from transmitting the feedback information to the base station. Subsequently, at 455 another DCI may be transmitted by the base station that overwrites previously configured CG resources and, instead, schedules a second data transmission to be performed (e.g., schedules a second uplink and/or downlink transmission).

Figure 5:
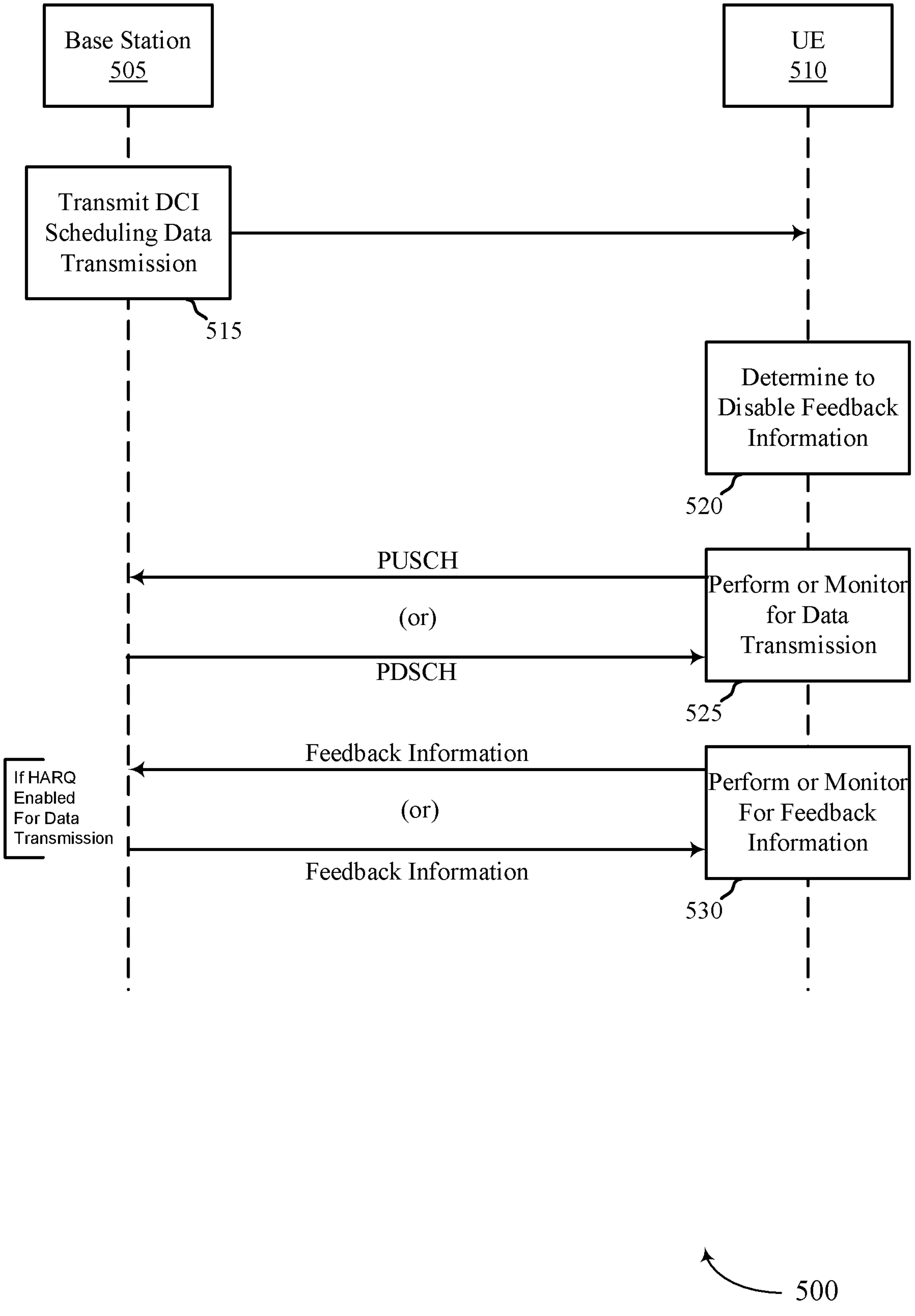
FIG. 5 illustrates an example of a process that supports an indication scheme for rateless code transmission without feedback information in accordance with aspects of the present disclosure.

FIG. 5 illustrates an example of a process 500 that supports an indication scheme for rateless code transmission without feedback information in accordance with aspects of the present disclosure. In some examples, process 500 may implement aspects of wireless communications systems 100 and/or 200, DCI configuration 300, and/or process 400. Aspects of process 500 may be implemented by or implemented at base station 505 and/or UE 510, which may be examples of the corresponding devices described herein.

At 515, base station 505 may schedule a data transmission for UE 510. For example, base station 505 may determine that it has a data transmission to perform with UE 510 (e.g., an uplink data transmission and/or a downlink data transmission). Base station 505 may determine that the data transmission will utilize a rateless coding scheme, e.g., network codes, etc. Base station 505 may determine to disable feedback information (e.g., HARQ feedback information) for the data transmission using the rateless coding. Accordingly, base station 505 may transmit or otherwise convey (and UE 510 may receive) a DCI carrying a grant scheduling the data transmission. The DCI may identify resources to be used for the data transmission. In some aspects, base station 505 may configure the DCI to carry or otherwise convey an indication that the feedback information has been disabled for the data transmission using rateless coding. For example, base station 505 may scramble a CRC portion of the DCI using a RNTI associated with rateless coding data transmissions. In another example, base station 505 may configure a field (e.g., a new field and/or modifying/repurpose an existing field) in the DCI to indicate to disable feedback information for the data transmission.

For example, the MCS, NDI, RV, DAI, TPC, PUSCH resource indicator, PDSCH-to-feedback information timing indicator, HARQ process number, and the like, alone or in any combination, fields of the DCI may be configured or otherwise convey the indication that feedback information has been disabled for the data transmission using rateless coding. In some aspects, base station 505 may use RRC signaling to configure UE 510 with one or more SS sets and/or CORESETs, with the scheduling DCI transmitted in a particular SS set and/or CORESET being used to convey the indication that feedback information is disabled. In some aspects, base station 505 may use RRC signaling to configure SPS/CG resources without feedback information enabled, and the DCI activating a particular SPS/CG resource conveys the indication that feedback information is disabled for a data transmission using rateless coding. In some aspects, HARQ process numbers may be allocated or otherwise associated with data transmissions using rateless coding with feedback information disabled. For example, a first set of one or more HARQ process numbers may be associated with a data transmission using non-rateless coding with feedback information enabled and a second set of one or more HARQ process numbers may be associated with a data transmission using rateless coding with feedback information disabled.

Accordingly, at 520 UE 510 may determine to disable feedback information for the data transmission based on the rateless coding scheme (e.g., based on the data transmission utilizing rateless coding), the DCI, a resource associated with the DCI (e.g., CORESET and/or SS set that the DCI was received in), and/or a SPS configuration associated with the data transmission (e.g., RRC configuration signaling configuring SPS/CG resources activated by the DCI). For example, UE 510 may identify or otherwise determine that a particular RNTI was used to scramble a CRC portion of the DCI. UE 510 may determine to disable feedback information for the data transmission using rateless coding based on the RNTI. For example, UE 510 may determine or otherwise identify which RNTI was used to scramble the CRC portion, and therefore determine whether that RNTI is associated with feedback information being enabled for a data transmission using non-rateless coding or disabled for a data transmission using rateless coding.

In some aspects, a new field may be added to the DCI that includes one or more bits associated with configuring the rateless coding scheme for the UE without feedback information. That is, a new field may be configured in the DCI and set to a value to indicate that the data transmission using rateless coding has feedback information disabled. In some aspects, an existing field may be used (e.g., modified and/or repurposed) to convey the indication that the data transmission using rateless coding has feedback information disabled. For example, an MCS field, an NDI field, and RV field, a DAI field, a TPC field/command, and the like, of the DCI, alone or in any combination, may be set to a value/values to convey the indication.

In some aspects, UE 510 may determine to disable feedback information for the data transmission using rateless coding based on the resource that the DCI was received in. For example, the UE may receive the DCI scheduling the data transmission in a first portion of the resource associated with the DCI (e.g., a first one or more CORESETs and/or SS sets) or in a second portion of the resource associated with the DCI (e.g., a second one or more CORESETs and/or SS sets). Based on the resource that the DCI was received in, UE 510 may determine that feedback information is disabled for the data transmission using rateless coding.

In some aspects, UE 510 may determine to disable feedback information for the data transmission using rateless coding based on RRC configuration signaling indicating SPS configuration associated with the data transmission (e.g., the RRC configuration signal may configure SPS and/or CG resources activated by the scheduling DCI and used for the data transmission). Accordingly, UE 510 may determine that the scheduling DCI activates a particular set of semi-persistent resources, and that the configuration signal used to configure those semi-persistent resources indicated that the data transmission using rateless coding would have feedback information disabled.

In some aspects, UE 510 may determine to disable feedback information for the data transmission based on a HARQ process number indicated in the DCI. For example, a first set of one or more HARQ process numbers may be associated with non-rateless coding data transmissions with feedback information enabled and a second set of HARQ process numbers may be associated with rateless coding data transmissions with feedback information disabled.

Accordingly and at 525, UE 510 may perform or monitor for the data transmission according to the DCI and the rateless coding scheme. That is, in a downlink scenario UE 510 may receive a PDSCH data transmission from base station 505. In an uplink scenario, UE 510 may transmit the PUSCH data transmission to base station 505. The data transmission may utilize a rateless coding scheme and may have feedback information disabled.

Accordingly and at 530, UE 510 may perform or monitor for the feedback information for the data transmission according to the determination of whether feedback information is enabled or disabled for the data transmission. That is, if the feedback information is enabled for a downlink data transmission using non-rateless coding, UE 510 may transmit the feedback information to base station 505 carrying or otherwise conveying ACK/NACK information for the data transmission. If the feedback information is enabled for an uplink transmission using non-rateless coding, UE 510 may receive the feedback information from base station 505 carrying or otherwise conveying ACK/NACK information for the data transmission.

If feedback information is disabled for the data transmission using rateless coding, UE 510 performing or monitoring for the feedback information may include UE 510 refraining from transmitting feedback information in a downlink data transmission scenario and/or base station 505 refraining from transmitting feedback information in an uplink data transmissions. Accordingly, base station 505 and/or UE 510 may utilize aspects of the described techniques to perform a data transmission (e.g., PDSCH and/or PUSCH) using a rateless coding scheme and convey an indication that feedback information for the data transmission is disabled.

Figure 6:
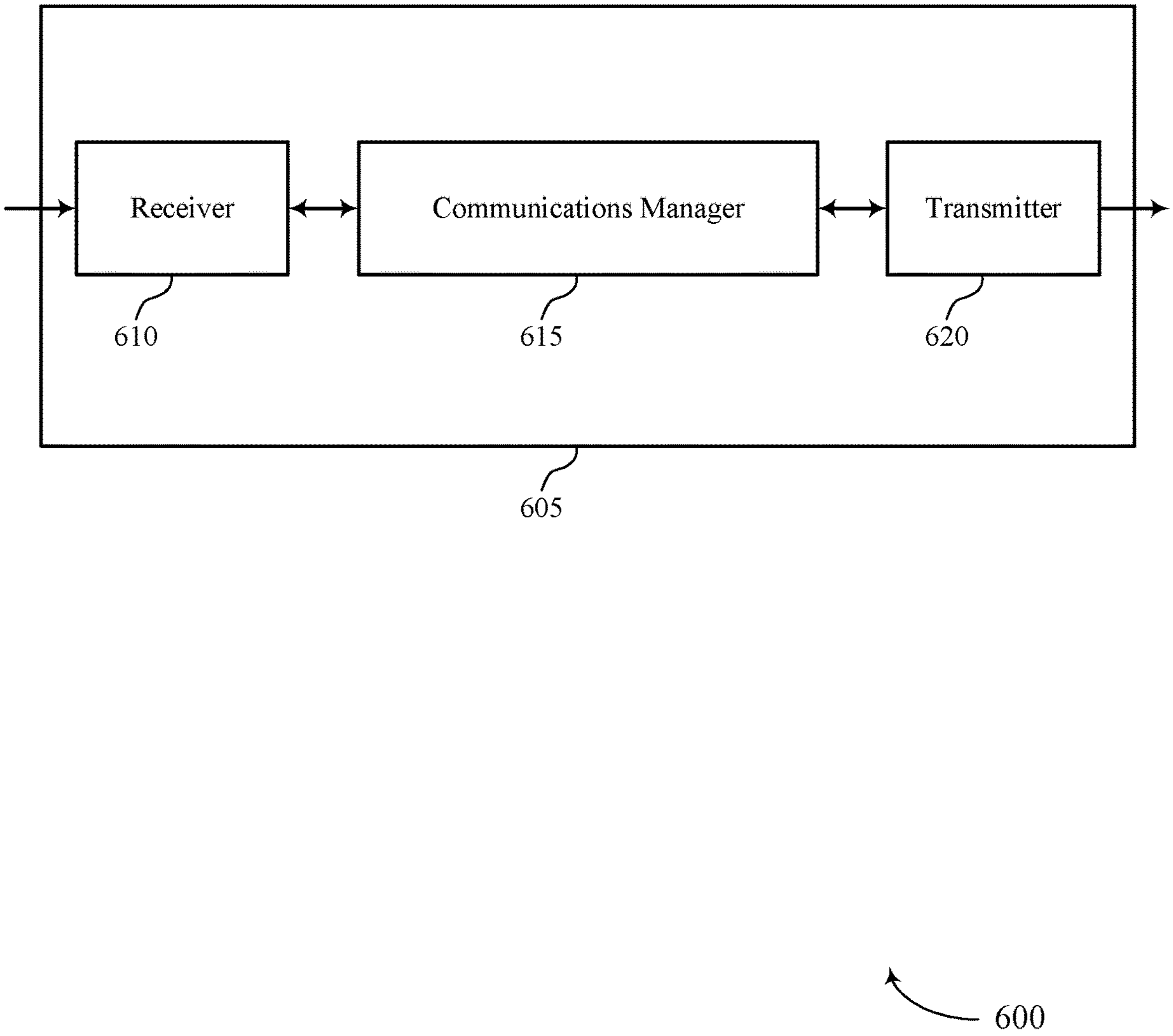
FIGS. 6 and 7 show block diagrams of devices that support an indication scheme for rateless code transmission without feedback information in accordance with aspects of the present disclosure.

FIG. 6 shows a block diagram 600 of a device 605 that supports an indication scheme for rateless code transmission without feedback information in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to an indication scheme for rateless code transmission without feedback information, etc.).

Information may be passed on to other components of the device 605. The receiver 610 may be an example of aspects of the transceiver 920 described with reference to FIG. 9. The receiver 610 may utilize a single antenna or a set of antennas.

The communications manager 615 may receive a DCI including a grant scheduling a data transmission for the UE, the data transmission associated with a rateless coding scheme, determine to disable feedback information for the data transmission based on the rateless coding scheme and one or more of: the DCI, a resource associated with the DCI, or a semi-persistent scheduling configuration associated with the data transmission, perform or monitor for the data transmission according to the DCI and the rateless coding scheme, and perform or monitor for the feedback information for the data transmission according to the determining. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
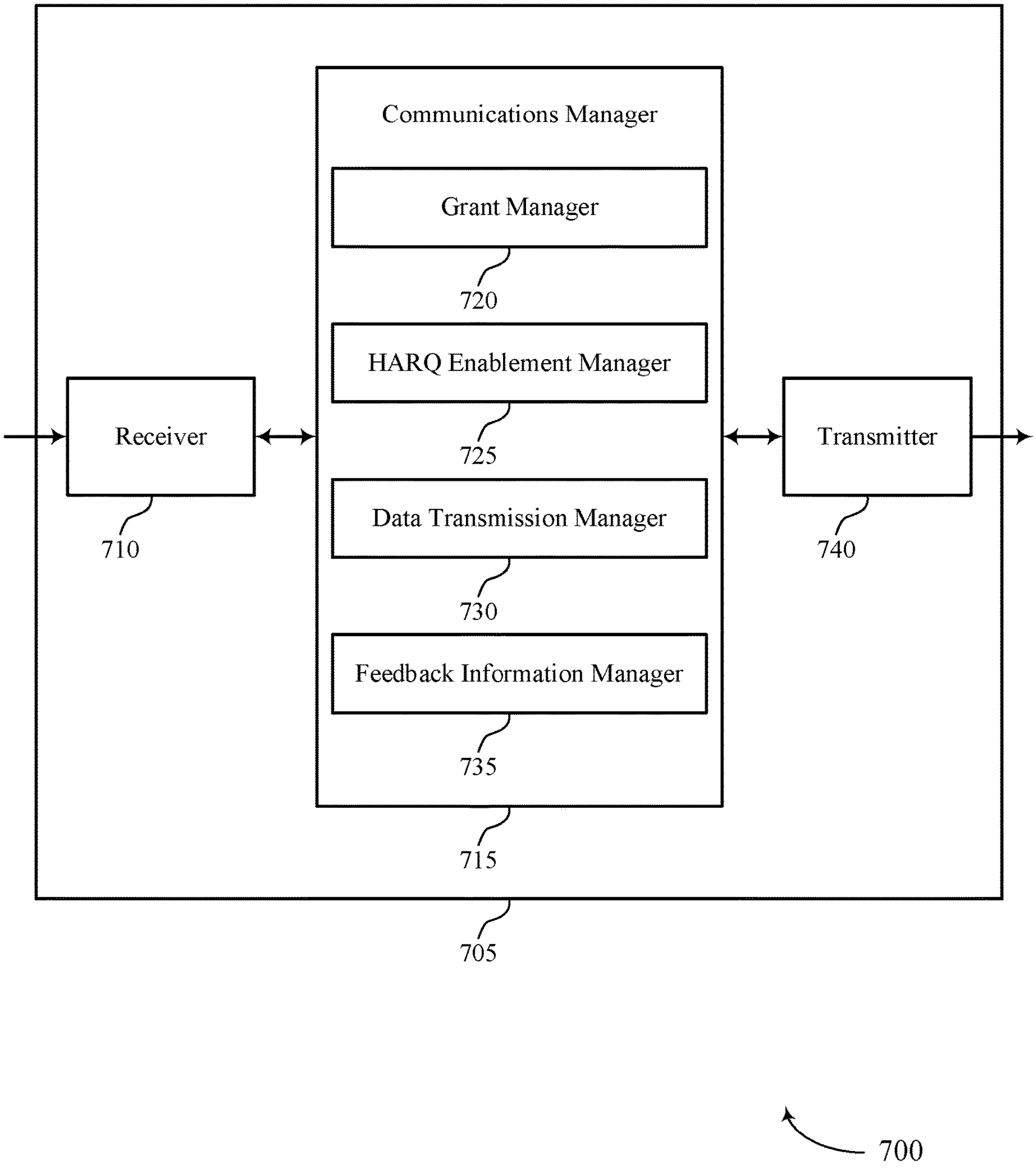

FIG. 7 shows a block diagram 700 of a device 705 that supports an indication scheme for rateless code transmission without feedback information in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to an indication scheme for rateless code transmission without feedback information, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a grant manager 720, a HARQ enablement manager 725, a data transmission manager 730, and a feedback information manager 735. The communications manager 715 may be an example of aspects of the communications manager 910 described herein.

The grant manager 720 may receive a DCI including a grant scheduling a data transmission for the UE, the data transmission associated with a rateless coding scheme.

The HARQ enablement manager 725 may determine to disable feedback information for the data transmission based on the rateless coding scheme and one or more of: the DCI, a resource associated with the DCI, or a semi-persistent scheduling configuration associated with the data transmission.

The data transmission manager 730 may perform or monitor for the data transmission according to the DCI and the rateless coding scheme.

The feedback information manager 735 may perform or monitor for the feedback information for the data transmission according to the determining.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
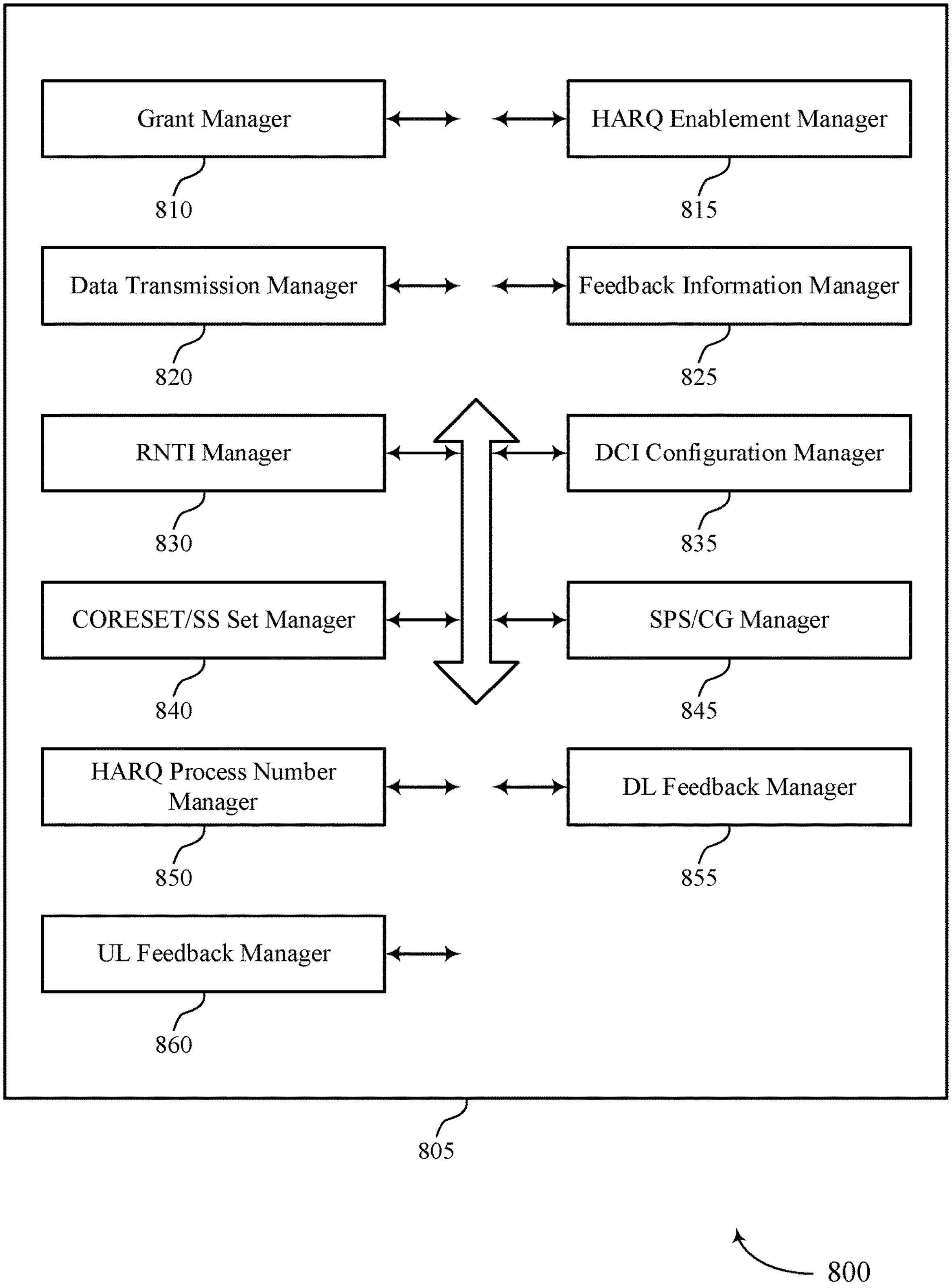
FIG. 8 shows a block diagram of a communications manager that supports an indication scheme for rateless code transmission without feedback information in accordance with aspects of the present disclosure.

FIG. 8 shows a block diagram 800 of a communications manager 805 that supports an indication scheme for rateless code transmission without feedback information in accordance with aspects of the present disclosure. The communications manager 805 may be an example of aspects of a communications manager 615, a communications manager 715, or a communications manager 910 described herein. The communications manager 805 may include a grant manager 810, a HARQ enablement manager 815, a data transmission manager 820, a feedback information manager 825, a RNTI manager 830, a DCI configuration manager 835, a CORESET/SS set manager 840, a SPS/CG manager 845, a HARQ process number manager 850, a DL feedback manager 855, and an UL feedback manager 860. Each of these modules may communicate, directly or indirectly, with one another (e.g., via one or more buses).

The grant manager 810 may receive a DCI including a grant scheduling a data transmission for the UE, the data transmission associated with a rateless coding scheme.

The HARQ enablement manager 815 may determine to disable feedback information for the data transmission based on the rateless coding scheme and one or more of: the DCI, a resource associated with the DCI, or a semi-persistent scheduling configuration associated with the data transmission.

The data transmission manager 820 may perform or monitor for the data transmission according to the DCI and the rateless coding scheme.

The feedback information manager 825 may perform or monitor for the feedback information for the data transmission according to the determining.

The RNTI manager 830 may identify a radio network temporary identifier used to scramble a cyclic redundancy check portion of the DCI. In some examples, the RNTI manager 830 may determine to disable feedback information for the data transmission based on the radio network temporary identifier.

The DCI configuration manager 835 may determine to disable feedback information for the data transmission based on a field indicated in the DCI. In some cases, the field includes one or more bits associated with configuring the rateless coding scheme for the UE without feedback information, a modulation and coding scheme field, a new data indicator, a redundancy version field, a downlink assignment index field, a transmit power control field, a physical uplink shared channel resource indicator, a physical downlink shared channel to feedback information timing indicator field, a hybrid automatic repeat/request process number, or a combination thereof.

The CORESET/SS set manager 840 may receive the DCI in a first portion of the resource associated with the DCI or a second portion of the resource associated with the DCI. In some examples, the CORESET/SS set manager 840 may determine to disable feedback information for the data transmission based on the DCI received in the first portion of the resource or the second portion of the resource. In some cases, the resource associated with the DCI includes a CORESET, a SS set, or both.

The SPS/CG manager 845 may receive a RRC configuration indicating the semi-persistent scheduling configuration associated with the data transmission. In some examples, the SPS/CG manager 845 may determine to disable feedback information for the data transmission based on the RRC configuration. In some cases, the RRC configuration includes a SPS configuration indication, a CG configuration indication, or both.

The HARQ process number manager 850 may identify a HARQ process number indicated in the DCI. In some examples, the HARQ process number manager 850 may determine to disable feedback information for the data transmission based on the HARQ process number. In some cases, a first set of HARQ process numbers indicate that the feedback information is disabled for the data transmission and a second set of HARQ process numbers indicate that the feedback information is enabled for a data transmission using a non-rateless coding scheme. The HARQ process number manager 850 may transmit a UE capability message indicating support for performing or monitoring for the data transmission associated with rateless coding scheme where the feedback information is disabled. In some cases, the DCI is based at least in part on the UE capability message.

Figure 9:
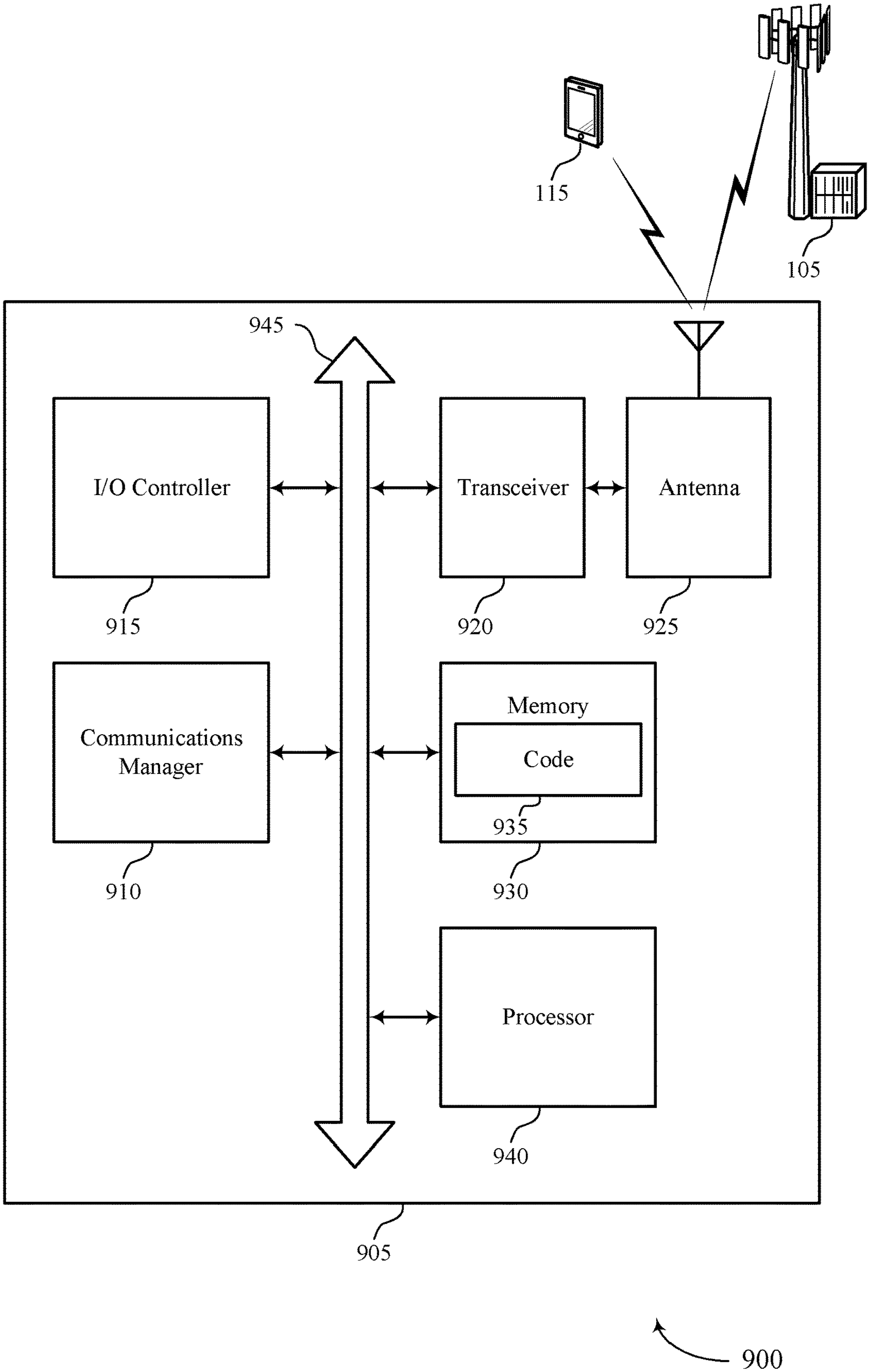
FIG. 9 shows a diagram of a system including a device that supports an indication scheme for rateless code transmission without feedback information in accordance with aspects of the present disclosure.

FIG. 9 shows a diagram of a system 900 including a device 905 that supports an indication scheme for rateless code transmission without feedback information in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a DCI including a grant scheduling a data transmission for the UE, the data transmission associated with a rateless coding scheme, determine to disable feedback information for the data transmission based on the rateless coding scheme and one or more of: the DCI, a resource associated with the DCI, or a semi-persistent scheduling configuration associated with the data transmission, perform or monitor for the data transmission according to the DCI and the rateless coding scheme, and perform or monitor for the feedback information for the data transmission according to the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting an indication scheme for rateless code transmission without feedback information).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
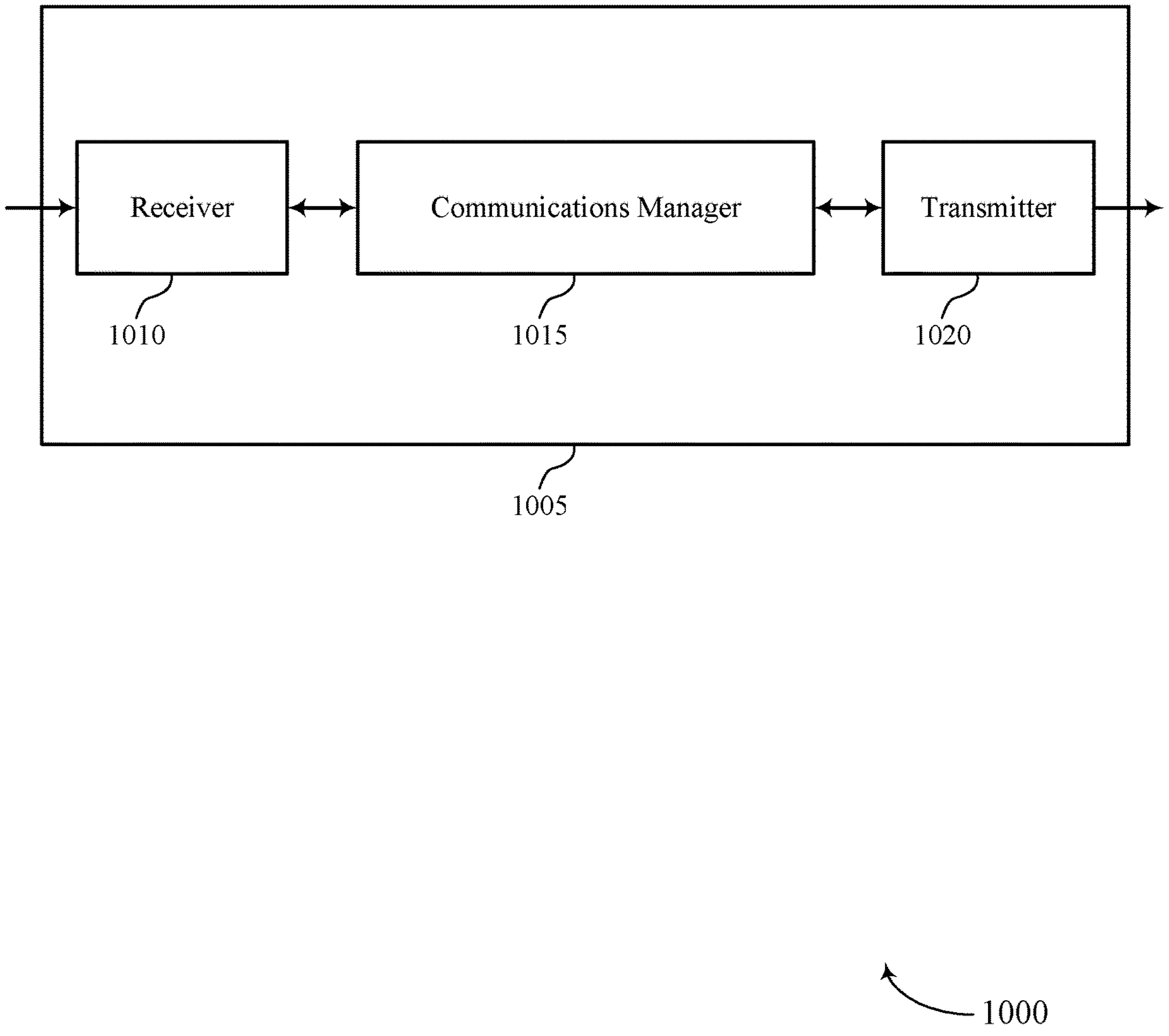
FIGS. 10 and 11 show block diagrams of devices that support an indication scheme for rateless code transmission without feedback information in accordance with aspects of the present disclosure.

FIG. 10 shows a block diagram 1000 of a device 1005 that supports an indication scheme for rateless code transmission without feedback information in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to an indication scheme for rateless code transmission without feedback information, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine to disable feedback information for a data transmission with a UE, the data transmission associated with a rateless coding scheme, transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission, perform or monitor for the data transmission according to the DCI and the rateless coding scheme, and perform or monitor for the feedback information for the data transmission according to the determining. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
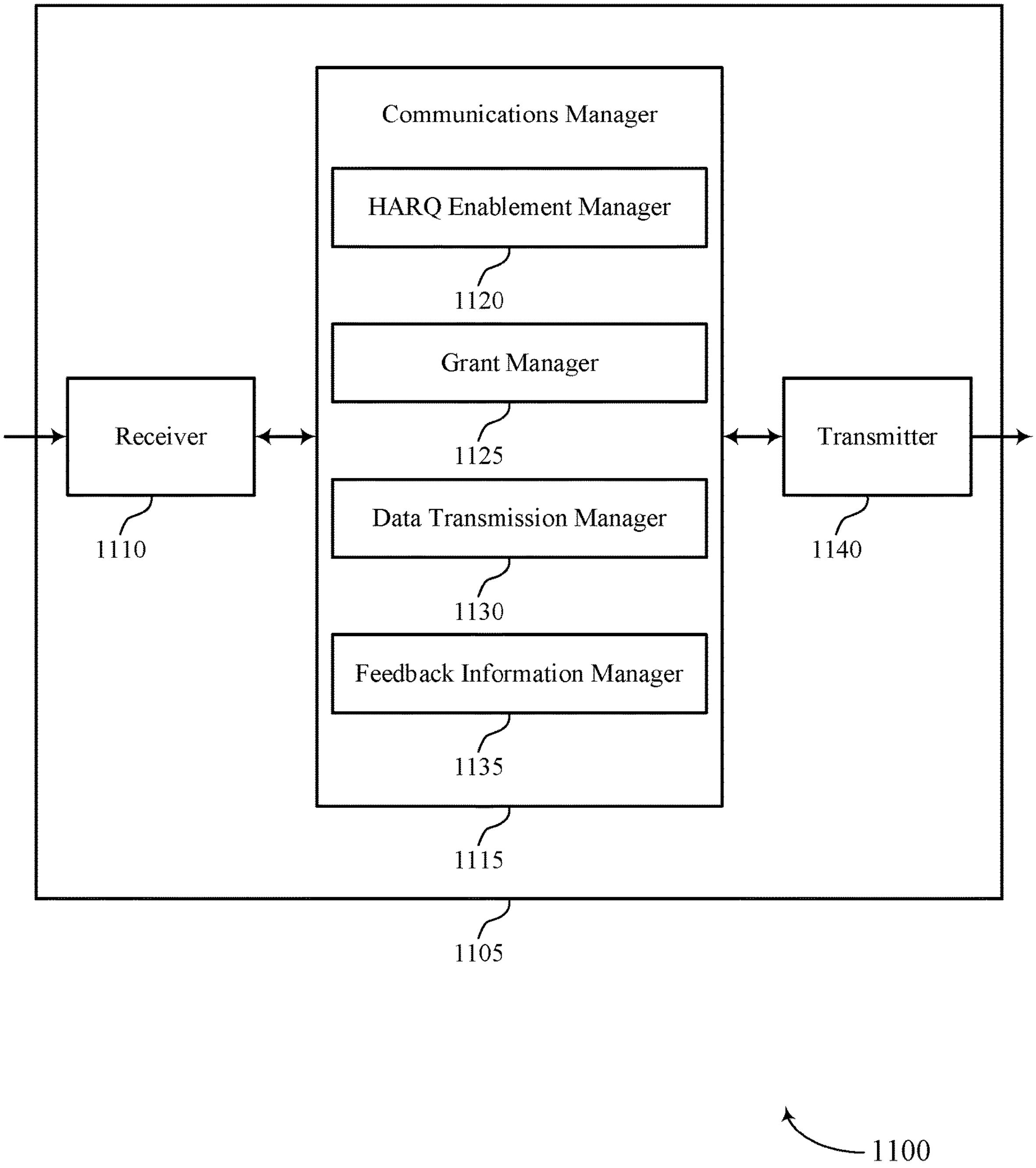

FIG. 11 shows a block diagram 1100 of a device 1105 that supports an indication scheme for rateless code transmission without feedback information in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to an indication scheme for rateless code transmission without feedback information, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a HARQ enablement manager 1120, a grant manager 1125, a data transmission manager 1130, and a feedback information manager 1135. The communications manager 1115 may be an example of aspects of the communications manager 1310 described herein.

The HARQ enablement manager 1120 may determine to disable feedback information for a data transmission with a UE, the data transmission associated with a rateless coding scheme.

The grant manager 1125 may transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission.

The data transmission manager 1130 may perform or monitor for the data transmission according to the DCI and the rateless coding scheme.

The feedback information manager 1135 may perform or monitor for the feedback information for the data transmission according to the determining.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
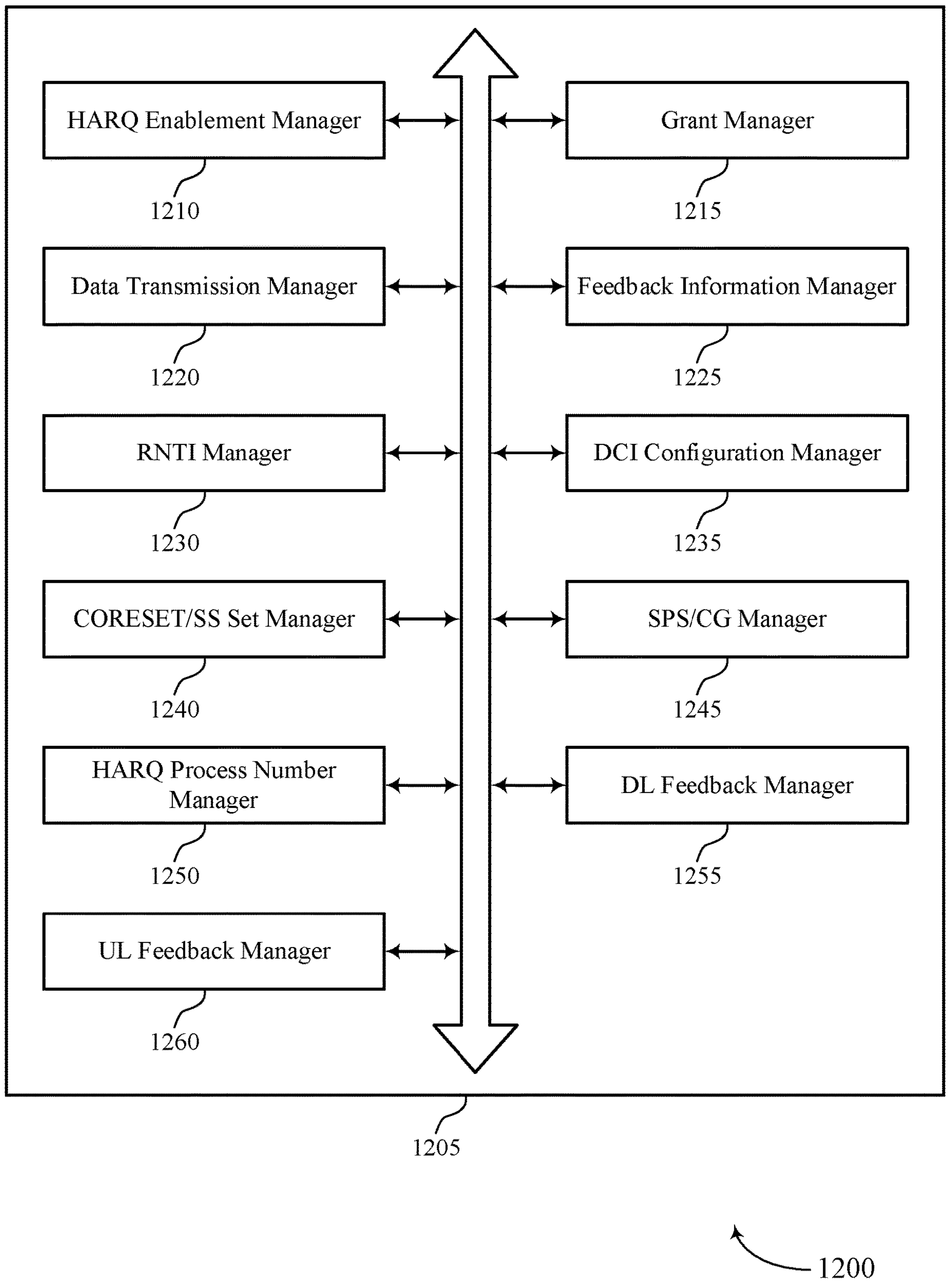
FIG. 12 shows a block diagram of a communications manager that supports an indication scheme for rateless code transmission without feedback information in accordance with aspects of the present disclosure.

FIG. 12 shows a block diagram 1200 of a communications manager 1205 that supports an indication scheme for rateless code transmission without feedback information in accordance with aspects of the present disclosure. The communications manager 1205 may be an example of aspects of a communications manager 1015, a communications manager 1115, or a communications manager 1310 described herein. The communications manager 1205 may include a HARQ enablement manager 1210, a grant manager 1215, a data transmission manager 1220, a feedback information manager 1225, a RNTI manager 1230, a DCI configuration manager 1235, a CORESET/SS set manager 1240, a SPS/CG manager 1245, a HARQ process number manager 1250, a DL feedback manager 1255, and an UL feedback manager 1260. Each of these modules may communicate, directly or indirectly, with one another (e.g., via one or more buses).

The HARQ enablement manager 1210 may determine to disable feedback information for a data transmission with a UE, the data transmission associated with a rateless coding scheme.

The grant manager 1215 may transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission.

The data transmission manager 1220 may perform or monitor for the data transmission according to the DCI and the rateless coding scheme.

The feedback information manager 1225 may perform or monitor for the feedback information for the data transmission according to the determining.

The RNTI manager 1230 may scramble a CRC portion of the DCI using RNTI that is based on the determining to disable feedback information for the data transmission.

The DCI configuration manager 1235 may configure a field in the DCI to indicate to disable feedback information for the data transmission. In some cases, the field includes one or more bits associated with configuring the rateless coding scheme for the UE without feedback information, a modulation and coding scheme field, a new data indicator, a redundancy version field, a downlink assignment index field, a transmit power control field, a physical uplink shared channel resource indicator, a physical downlink shared channel to feedback information timing indicator field, a hybrid automatic repeat/request process number, or a combination thereof.

The CORESET/SS set manager 1240 may transmit the DCI in a first portion of the resource associated with the DCI or a second portion of the resource associated with the DCI, where transmitting the DCI in the first portion or the second portion indicates to disable feedback information for the data transmission. In some cases, the resource associated with the DCI includes a CORESET, a SS set, or both.

The SPS/CG manager 1245 may transmit a radio resource control configuration indicating the semi-persistent scheduling configuration associated with the data transmission, where the radio resource control information indicates to disable feedback information for the data transmission based on the radio resource control configuration. In some cases, the radio resource control configuration includes a SPS configuration indication, a CG configuration indication, or both.

The HARQ process number manager 1250 may select a HARQ process number indicated in the DCI that indicates to disable feedback information for the data transmission. In some cases, a first set of HARQ process numbers indicate that the feedback information is disabled for the data transmission and a second set of HARQ process numbers indicate that the feedback information is enabled for a data transmission using a non-rateless coding scheme. The HARQ process number manager 1250 may receive a UE capability message indicating support for performing or monitoring for the data transmission associated with rateless coding scheme where the feedback information is disabled, wherein the DCI is based at least in part on the UE capability message.

Figure 13:
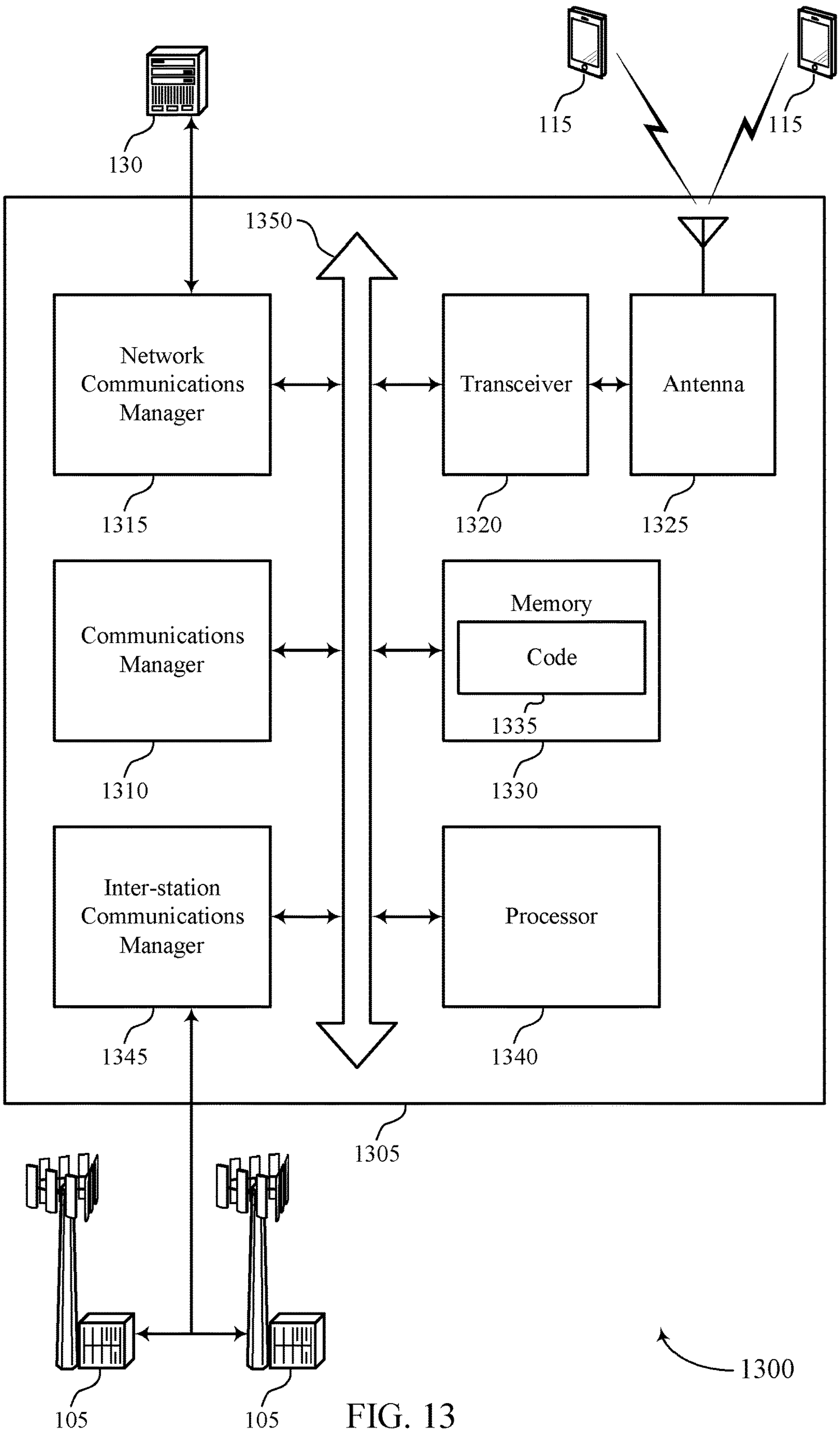
FIG. 13 shows a diagram of a system including a device that supports an indication scheme for rateless code transmission without feedback information in accordance with aspects of the present disclosure.

FIG. 13 shows a diagram of a system 1300 including a device 1305 that supports an indication scheme for rateless code transmission without feedback information in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine to disable feedback information for a data transmission with a UE, the data transmission associated with a rateless coding scheme, transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission, perform or monitor for the data transmission according to the DCI and the rateless coding scheme, and perform or monitor for the feedback information for the data transmission according to the determining.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting an indication scheme for rateless code transmission without feedback information).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
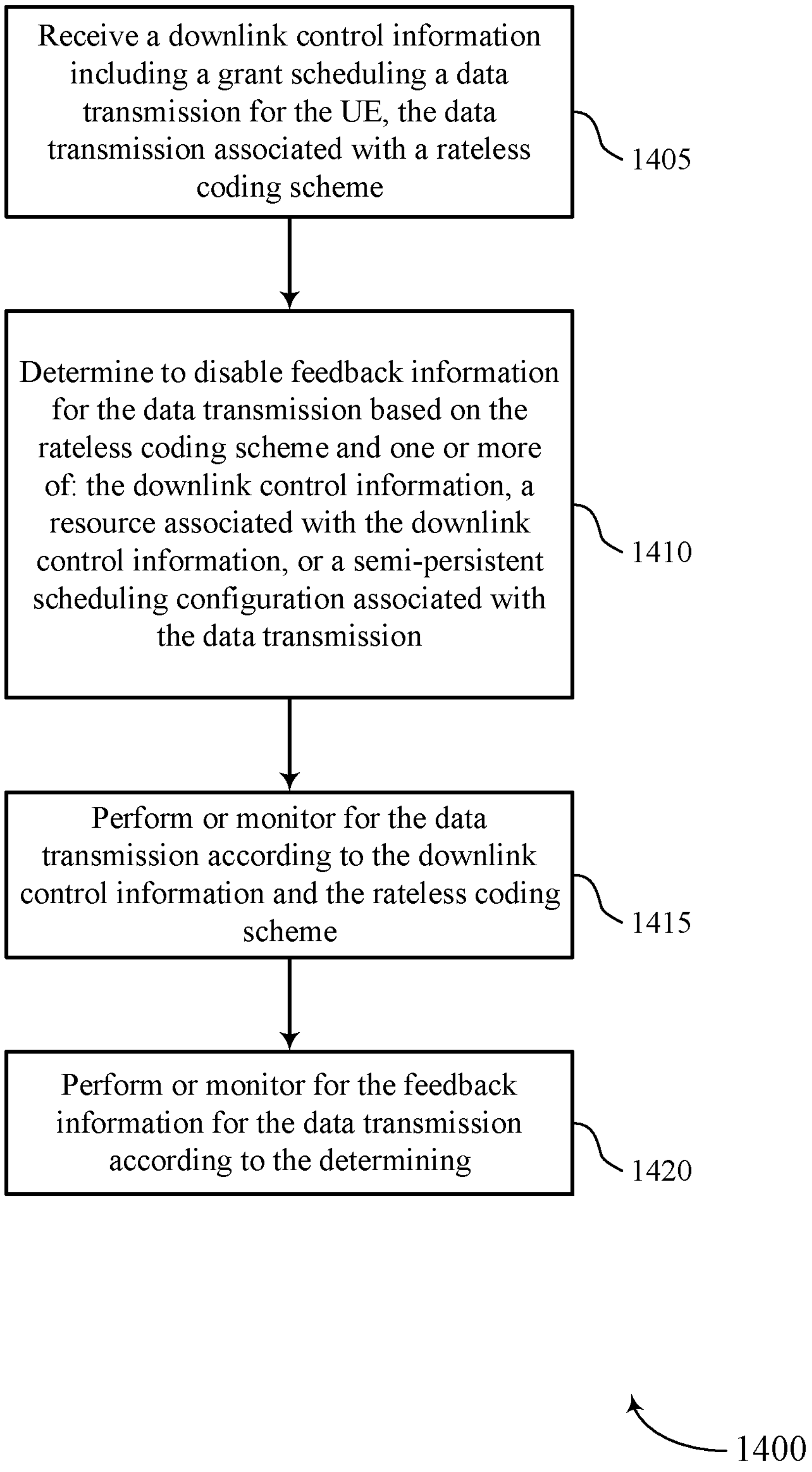
FIGS. 14 through 18 show flowcharts illustrating methods that support an indication scheme for rateless code transmission without feedback information in accordance with aspects of the present disclosure.

FIG. 14 shows a flowchart illustrating a method 1400 that supports an indication scheme for rateless code transmission without feedback information in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may receive a DCI including a grant scheduling a data transmission for the UE, the data transmission associated with a rateless coding scheme. The operations of 1405 may be performed according to the methods described herein. In some examples, aspects of the operations of 1405 may be performed by a grant manager as described with reference to FIGS. 6 through 9.

At 1410, the UE may determine to disable feedback information for the data transmission based on the rateless coding scheme and one or more of: the DCI, a resource associated with the DCI, or a semi-persistent scheduling configuration associated with the data transmission. The operations of 1410 may be performed according to the methods described herein. In some examples, aspects of the operations of 1410 may be performed by a HARQ enablement manager as described with reference to FIGS. 6 through 9.

At 1415, the UE may perform or monitor for the data transmission according to the DCI and the rateless coding scheme. The operations of 1415 may be performed according to the methods described herein. In some examples, aspects of the operations of 1415 may be performed by a data transmission manager as described with reference to FIGS. 6 through 9.

At 1420, the UE may perform or monitor for the feedback information for the data transmission according to the determining. The operations of 1420 may be performed according to the methods described herein. In some examples, aspects of the operations of 1420 may be performed by a feedback information manager as described with reference to FIGS. 6 through 9.

Figure 15:
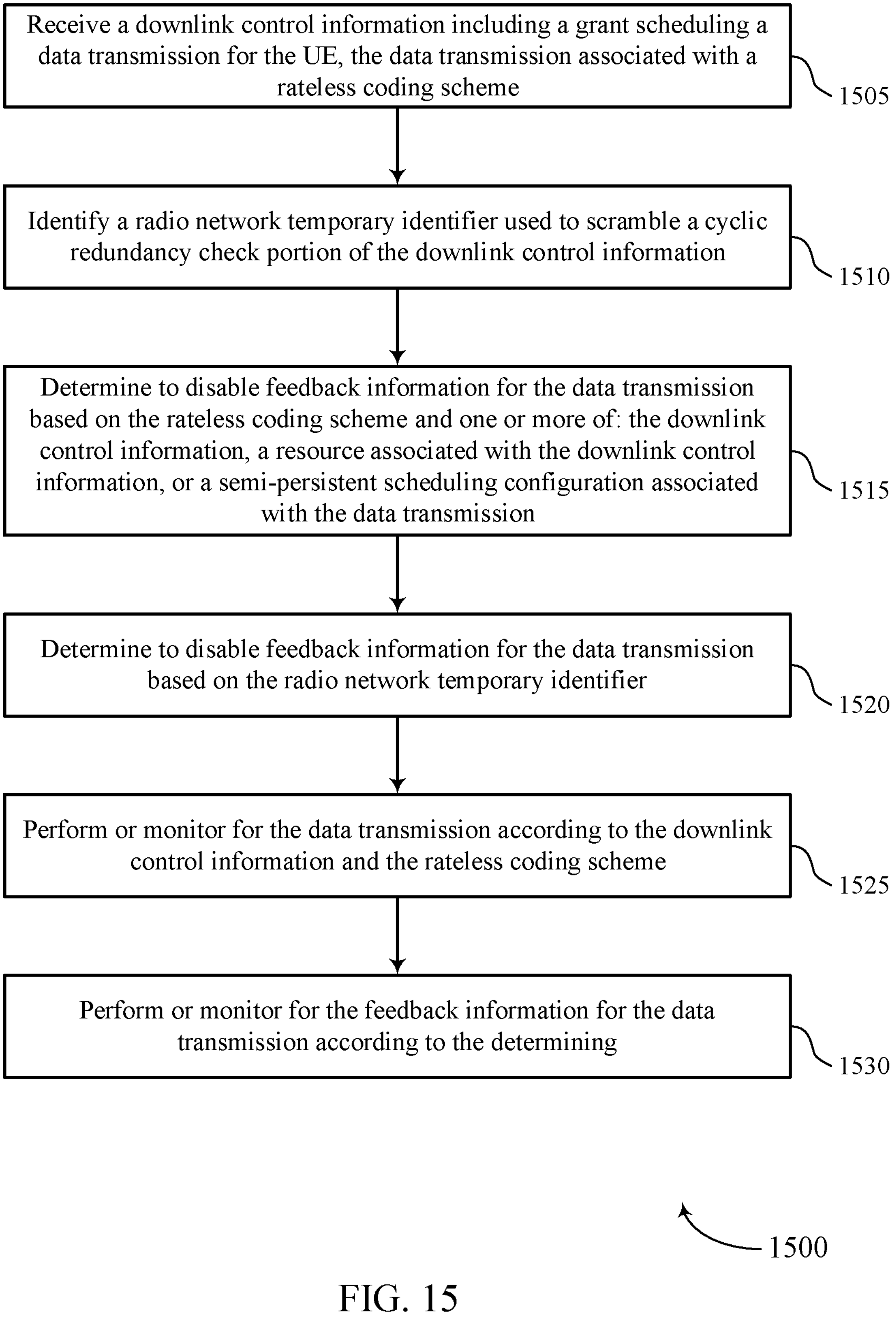

FIG. 15 shows a flowchart illustrating a method 1500 that supports an indication scheme for rateless code transmission without feedback information in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may receive a DCI including a grant scheduling a data transmission for the UE, the data transmission associated with a rateless coding scheme. The operations of 1505 may be performed according to the methods described herein. In some examples, aspects of the operations of 1505 may be performed by a grant manager as described with reference to FIGS. 6 through 9.

At 1510, the UE may identify a radio network temporary identifier used to scramble a cyclic redundancy check portion of the DCI. The operations of 1510 may be performed according to the methods described herein. In some examples, aspects of the operations of 1510 may be performed by a RNTI manager as described with reference to FIGS. 6 through 9.

At 1515, the UE may determine to disable feedback information for the data transmission based on the rateless coding scheme and one or more of: the DCI, a resource associated with the DCI, or a semi-persistent scheduling configuration associated with the data transmission. The operations of 1515 may be performed according to the methods described herein. In some examples, aspects of the operations of 1515 may be performed by a HARQ enablement manager as described with reference to FIGS. 6 through 9.

At 1520, the UE may determine to disable feedback information for the data transmission based on the radio network temporary identifier. The operations of 1520 may be performed according to the methods described herein. In some examples, aspects of the operations of 1520 may be performed by a RNTI manager as described with reference to FIGS. 6 through 9.

At 1525, the UE may perform or monitor for the data transmission according to the DCI and the rateless coding scheme. The operations of 1525 may be performed according to the methods described herein. In some examples, aspects of the operations of 1525 may be performed by a data transmission manager as described with reference to FIGS. 6 through 9.

At 1530, the UE may perform or monitor for the feedback information for the data transmission according to the determining. The operations of 1530 may be performed according to the methods described herein. In some examples, aspects of the operations of 1530 may be performed by a feedback information manager as described with reference to FIGS. 6 through 9.

Figure 16:
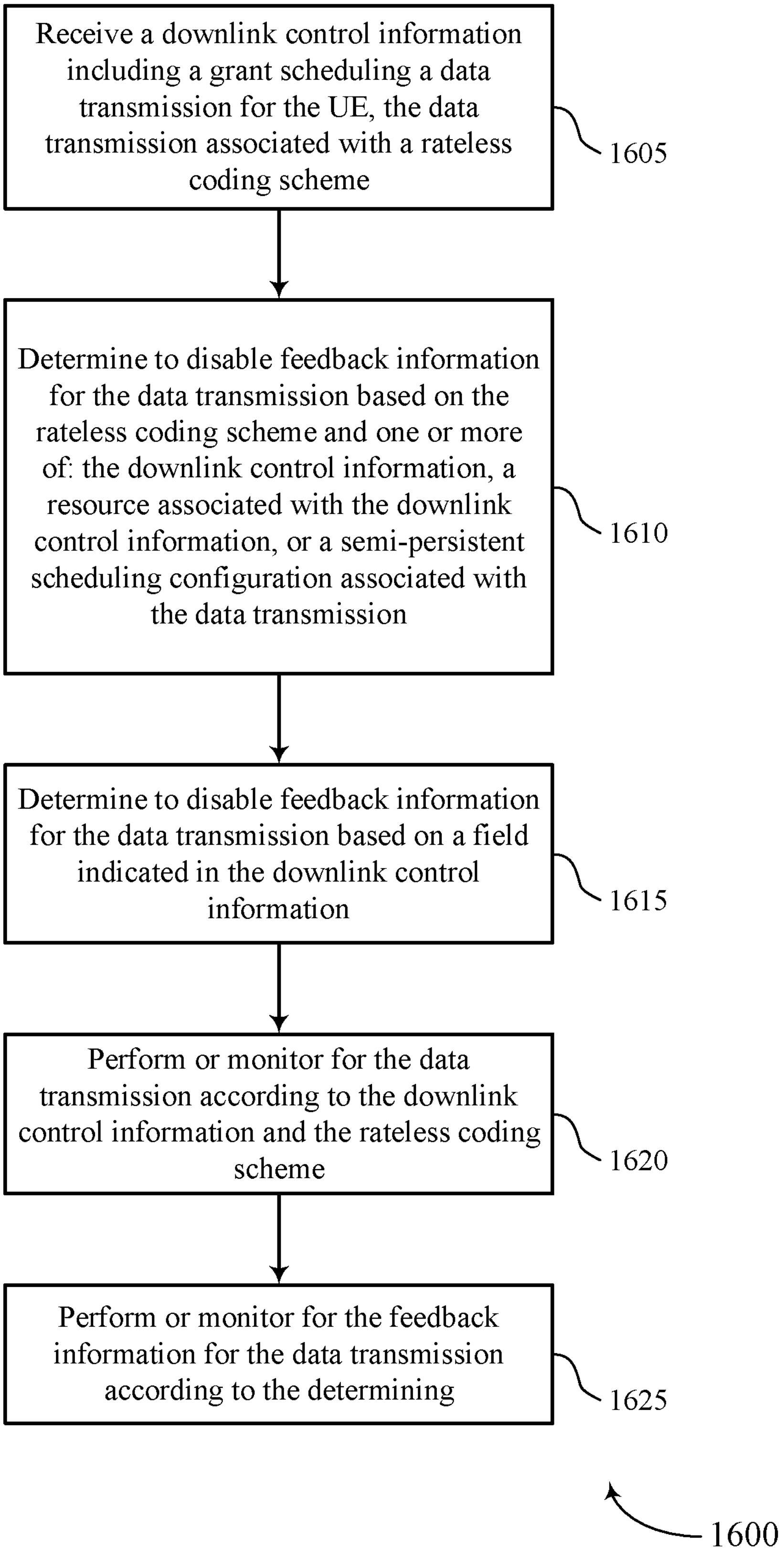

FIG. 16 shows a flowchart illustrating a method 1600 that supports an indication scheme for rateless code transmission without feedback information in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the UE may receive a DCI including a grant scheduling a data transmission for the UE, the data transmission associated with a rateless coding scheme. The operations of 1605 may be performed according to the methods described herein. In some examples, aspects of the operations of 1605 may be performed by a grant manager as described with reference to FIGS. 6 through 9.

At 1610, the UE may determine to disable feedback information for the data transmission based on the rateless coding scheme and one or more of: the DCI, a resource associated with the DCI, or a semi-persistent scheduling configuration associated with the data transmission. The operations of 1610 may be performed according to the methods described herein. In some examples, aspects of the operations of 1610 may be performed by a HARQ enablement manager as described with reference to FIGS. 6 through 9.

At 1615, the UE may determine to disable feedback information for the data transmission based on a field indicated in the DCI. The operations of 1615 may be performed according to the methods described herein. In some examples, aspects of the operations of 1615 may be performed by a DCI configuration manager as described with reference to FIGS. 6 through 9.

At 1620, the UE may perform or monitor for the data transmission according to the DCI and the rateless coding scheme. The operations of 1620 may be performed according to the methods described herein. In some examples, aspects of the operations of 1620 may be performed by a data transmission manager as described with reference to FIGS. 6 through 9.

At 1625, the UE may perform or monitor for the feedback information for the data transmission according to the determining. The operations of 1625 may be performed according to the methods described herein. In some examples, aspects of the operations of 1625 may be performed by a feedback information manager as described with reference to FIGS. 6 through 9.

Figure 17:
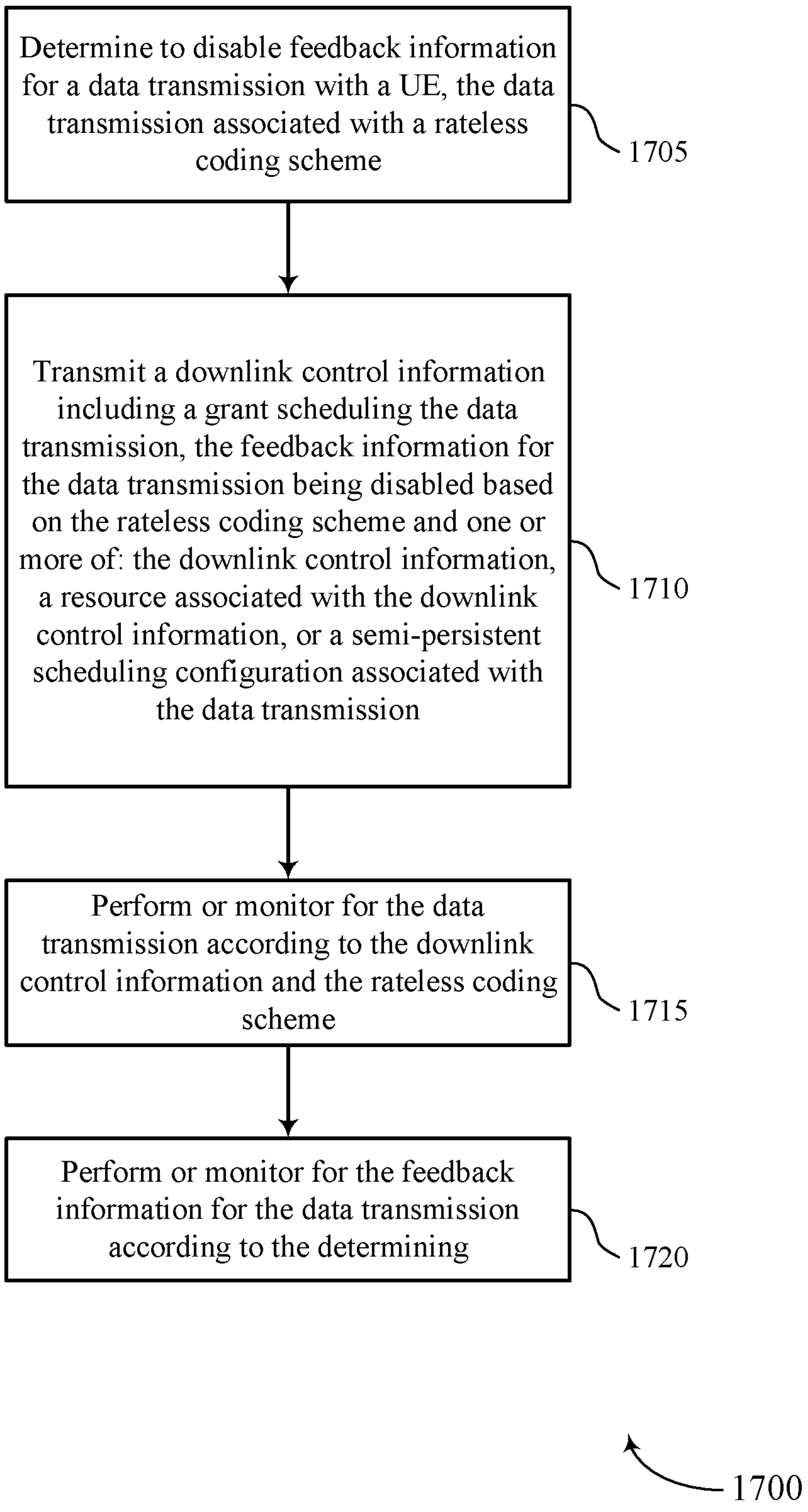

FIG. 17 shows a flowchart illustrating a method 1700 that supports an indication scheme for rateless code transmission without feedback information in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1705, the base station may determine to disable feedback information for a data transmission with a UE, the data transmission associated with a rateless coding scheme. The operations of 1705 may be performed according to the methods described herein. In some examples, aspects of the operations of 1705 may be performed by a HARQ enablement manager as described with reference to FIGS. 10 through 13.

At 1710, the base station may transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission. The operations of 1710 may be performed according to the methods described herein. In some examples, aspects of the operations of 1710 may be performed by a grant manager as described with reference to FIGS. 10 through 13.

At 1715, the base station may perform or monitor for the data transmission according to the DCI and the rateless coding scheme. The operations of 1715 may be performed according to the methods described herein. In some examples, aspects of the operations of 1715 may be performed by a data transmission manager as described with reference to FIGS. 10 through 13.

At 1720, the base station may perform or monitor for the feedback information for the data transmission according to the determining. The operations of 1720 may be performed according to the methods described herein. In some examples, aspects of the operations of 1720 may be performed by a feedback information manager as described with reference to FIGS. 10 through 13.

Figure 18:
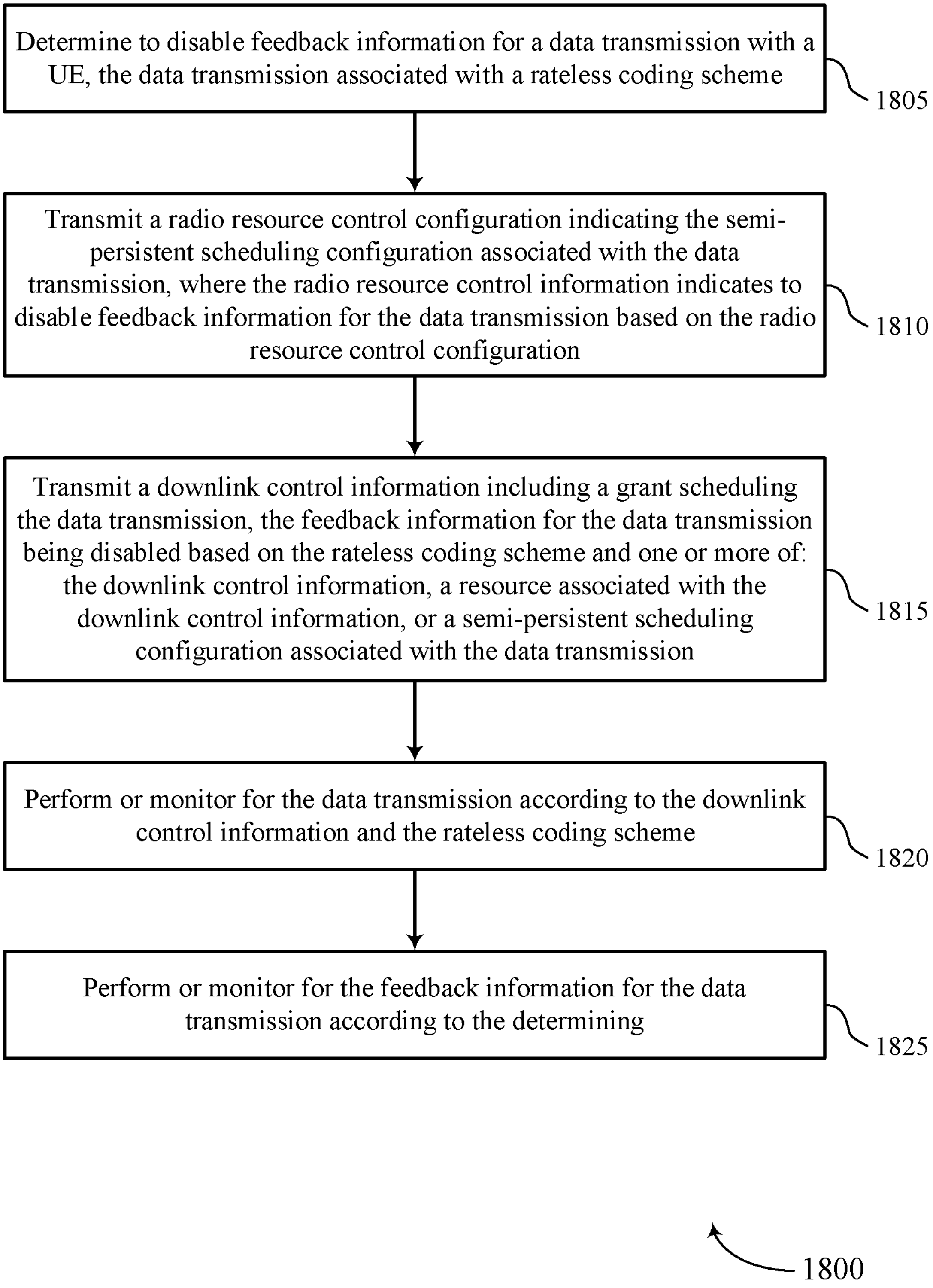

FIG. 18 shows a flowchart illustrating a method 1800 that supports an indication scheme for rateless code transmission without feedback information in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1805, the base station may determine to disable feedback information for a data transmission with a UE, the data transmission associated with a rateless coding scheme. The operations of 1805 may be performed according to the methods described herein. In some examples, aspects of the operations of 1805 may be performed by a HARQ enablement manager as described with reference to FIGS. 10 through 13.

At 1810, the base station may transmit a radio resource control configuration indicating the semi-persistent scheduling configuration associated with the data transmission, where the radio resource control information indicates to disable feedback information for the data transmission based on the radio resource control configuration. The operations of 1810 may be performed according to the methods described herein. In some examples, aspects of the operations of 1810 may be performed by a SPS/CG manager as described with reference to FIGS. 10 through 13.

At 1815, the base station may transmit a DCI including a grant scheduling the data transmission, the feedback information for the data transmission being enabled or disabled based on the rateless coding scheme and one or more of: the DCI, a resource associated with the DCI, or a semi-persistent scheduling configuration associated with the data transmission. The operations of 1815 may be performed according to the methods described herein. In some examples, aspects of the operations of 1815 may be performed by a grant manager as described with reference to FIGS. 10 through 13.

At 1820, the base station may perform or monitor for the data transmission according to the DCI and the rateless coding scheme. The operations of 1820 may be performed according to the methods described herein. In some examples, aspects of the operations of 1820 may be performed by a data transmission manager as described with reference to FIGS. 10 through 13.

At 1825, the base station may perform or monitor for the feedback information for the data transmission according to the determining. The operations of 1825 may be performed according to the methods described herein. In some examples, aspects of the operations of 1825 may be performed by a feedback information manager as described with reference to FIGS. 10 through 13.

The following provides an overview of aspects of the present disclosure:

Aspect 1: A method for wireless communication at a UE, comprising: receiving a DCI comprising a grant scheduling a data transmission for the UE, the data transmission associated with a rateless coding scheme; determining to disable feedback information for the data transmission based at least in part on the rateless coding scheme and one or more of: the DCI, a resource associated with the DCI, or a SPS configuration associated with the data transmission; performing or monitoring for the data transmission according to the DCI and the rateless coding scheme; and performing or monitoring for the feedback information for the data transmission according to the determining.

Aspect 2: The method of aspect 1, further comprising: identifying a RNTI used to scramble a CRC portion of the DCI; and determining to disable feedback information for the data transmission based at least in part on the RNTI.

Aspect 3: The method of any of aspects 1 through 2, further comprising: determining to disable feedback information for the data transmission based at least in part on a field indicated in the DCI.

Aspect 4: The method of aspect 3, wherein the field comprises one or more bits associated with configuring the rateless coding scheme for the UE without feedback information, a MCS field, a NDI, a RV field, a DAI field, a TPC field, a PUSCH resource indicator, a PDSCH to feedback information timing indicator field, a HARQ process number, or a combination thereof.

Aspect 5: The method of any of aspects 1 through 4, further comprising: receiving the DCI in a first portion of the resource associated with the DCI or a second portion of the resource associated with the DCI; and determining to disable feedback information for the data transmission based at least in part on the DCI received in the first portion of the resource or the second portion of the resource.

Aspect 6: The method of aspect 5, wherein the resource associated with the DCI comprises a control resource set, a search space set, or both.

Aspect 7: The method of any of aspects 1 through 6, further comprising: receiving a RRC configuration indicating the SPS configuration associated with the data transmission; and determining to disable feedback information for the data transmission based at least in part on the RRC configuration.

Aspect 8: The method of aspect 7, wherein the RRC configuration comprises a SPS configuration indication, a CG configuration indication, or both.

Aspect 9: The method of any of aspects 1 through 8, further comprising: identifying a HARQ process number indicated in the DCI; and determining to disable feedback information for the data transmission based at least in part on the HARQ process number.

Aspect 10: The method of aspect 9, wherein a first set of HARQ process numbers indicate that the feedback information is disabled for the data transmission and a second set of HARQ process numbers indicate that the feedback information is enabled for a data transmission using a non-rateless coding scheme.

Aspect 11: The method of any of aspects 1 through 10, further comprising: transmitting a UE capability message indicating support for performing or monitoring for the data transmission associated with rateless coding scheme where the feedback information is disabled, wherein the DCI is based at least in part on the UE capability message.

Aspect 12: A method for wireless communication at a base station, comprising: determining to disable feedback information for a data transmission with a UE, the data transmission associated with a rateless coding scheme; transmitting a DCI comprising a grant scheduling the data transmission, the feedback information for the data transmission being disabled based at least in part on the rateless coding scheme and one or more of: the DCI, a resource associated with the DCI, or a SPS configuration associated with the data transmission; performing or monitoring for the data transmission according to the DCI and the rateless coding scheme; and performing or monitoring for the feedback information for the data transmission according to the determining.

Aspect 13: The method of aspect 12, further comprising: scrambling a CRC portion of the DCI using RNTI that is based at least in part on the determining to disable feedback information for the data transmission.

Aspect 14: The method of any of aspects 12 through 13, further comprising: configuring a field in the DCI to indicate to disable feedback information for the data transmission.

Aspect 15: The method of aspect 14, wherein the field comprises one or more bits associated with configuring the rateless coding scheme for the UE without feedback information, a MCS field, a NDI, a RV field, a DAI field, a TPC field, a PUSCH resource indicator, a PDSCH to feedback information timing indicator field, a HARQ process number, or a combination thereof.

Aspect 16: The method of any of aspects 12 through 15, further comprising: transmitting the DCI in a first portion of the resource associated with the DCI or a second portion of the resource associated with the DCI, wherein transmitting the DCI in the first portion or the second portion indicates to disable feedback information for the data transmission.

Aspect 17: The method of aspect 16, wherein the resource associated with the DCI comprises a control resource set, a search space set, or both.

Aspect 18: The method of any of aspects 12 through 17, further comprising: transmitting a RRC configuration indicating the SPS configuration associated with the data transmission, wherein the RRC configuration indicates to disable feedback information for the data transmission based at least in part on the RRC configuration.

Aspect 19: The method of aspect 18, wherein the RRC configuration comprises a SPS configuration indication, a CG configuration indication, or both.

Aspect 20: The method of any of aspects 12 through 19, further comprising: selecting a HARQ process number indicated in the DCI that indicates to disable feedback information for the data transmission.

Aspect 21: The method of aspect 20, wherein a first set of HARQ process numbers indicate that the feedback information is disabled for the data transmission using the rateless coding scheme and a second set of HARQ process numbers indicate that the feedback information is enabled for a data transmission using a non-rateless coding scheme.

Aspect 22: The method of any of aspects 12 through 21, further comprising: receiving a UE capability message indicating support for performing or monitoring for the data transmission associated with rateless coding scheme where the feedback information is disabled, wherein the DCI is based at least in part on the UE capability message.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

transmitting a capability message indicating support for transmitting or monitoring for data transmissions associated with a rateless coding scheme in which hybrid automatic repeat/request acknowledgment information is disabled;

receiving a downlink control information comprising a grant scheduling a data transmission for the UE, the data transmission utilizing the rateless coding scheme, wherein the downlink control information is based at least in part on the capability message, and wherein the hybrid automatic repeat/request acknowledgment information for the data transmission is disabled based at least in part on the data transmission utilizing the rateless coding scheme and based at least in part on one or more of: the downlink control information, a resource associated with the downlink control information, or a semi-persistent scheduling configuration associated with the data transmission; and transmitting or monitoring for the data transmission according to the downlink control information and the rateless coding scheme, wherein the UE refrains from monitoring for or transmitting the hybrid automatic repeat/request acknowledgment information for the data transmission in accordance with the hybrid automatic repeat/request acknowledgment information being disabled.

2. The method of claim 1, wherein the hybrid automatic repeat/request acknowledgment information for the data transmission is disabled based at least in part on a radio network temporary identifier used to scramble a cyclic redundancy check portion of the downlink control information.

3. The method of claim 1, wherein the hybrid automatic repeat/request acknowledgment information for the data transmission is disabled based at least in part on a field indicated in the downlink control information.

4. The method of claim 3, wherein the field comprises one or more bits associated with configuring the rateless coding scheme for the UE without the hybrid automatic repeat/request acknowledgment information, a modulation and coding scheme field, a new data indicator, a redundancy version field, a downlink assignment index field, a transmit power control field, a physical uplink shared channel resource indicator, a physical downlink shared channel to hybrid automatic repeat/request acknowledgment information timing indicator field, a hybrid automatic repeat/request process number, or a combination thereof.

5. The method of claim 1, further comprising:

receiving the downlink control information in a first portion of the resource associated with the downlink control information, different than a second portion of the resource associated with the downlink control information, wherein the hybrid automatic repeat/request acknowledgment information for the data transmission is disabled based at least in part on the downlink control information being received in the first portion of the resource.

6. The method of claim 5, wherein the resource associated with the downlink control information comprises a control resource set, a search space set, or both.

7. The method of claim 1, further comprising:

receiving a radio resource control configuration indicating the semi-persistent scheduling configuration associated with the data transmission, wherein the hybrid automatic repeat/request acknowledgment information for the data transmission is disabled based at least in part on the radio resource control configuration.

8. The method of claim 7, wherein the radio resource control configuration comprises a semi-persistent scheduling configuration indication, a configured grant configuration indication, or both.

9. The method of claim 1, wherein the hybrid automatic repeat/request acknowledgment information for the data transmission is disabled based at least in part on a hybrid automatic repeat/request process number indicated in the downlink control information.

10. The method of claim 9, wherein a first set of hybrid automatic repeat/request process numbers indicate that the hybrid automatic repeat/request acknowledgment information is disabled for the data transmission and a second set of hybrid automatic repeat/request process numbers indicate that the hybrid automatic repeat/request acknowledgment information is enabled for a data transmission using a non-rateless coding scheme.

11. A method for wireless communication at a network node, comprising:

receiving a capability message indicating support for transmitting or monitoring for data transmissions associated with a rateless coding scheme in which hybrid automatic repeat/request acknowledgment information is disabled;

transmitting a downlink control information comprising a grant scheduling a data transmission, with a user equipment (UE), utilizing the rateless coding scheme, wherein the downlink control information is based at least in part on the capability message, and wherein the hybrid automatic repeat/request acknowledgment information for the data transmission is disabled based at least in part on the data transmission utilizing the rateless coding scheme and based at least in part on one or more of: the downlink control information, a resource associated with the downlink control information, or a semi-persistent scheduling configuration associated with the data transmission; and transmitting or monitoring for the data transmission according to the downlink control information and the rateless coding scheme, wherein the network node refrains from monitoring for or transmitting the hybrid automatic repeat/request acknowledgment information for the data transmission in accordance with the hybrid automatic repeat/request acknowledgment information being disabled.

12. The method of claim 11, further comprising:

scrambling a cyclic redundancy check portion of the downlink control information using a radio network temporary identifier that indicates to disable the hybrid automatic repeat/request acknowledgment information for the data transmission.

13. The method of claim 11, further comprising:

configuring a field in the downlink control information to indicate to disable the hybrid automatic repeat/request acknowledgment information for the data transmission.

14. The method of claim 13, wherein the field comprises one or more bits associated with configuring the rateless coding scheme for the UE without the hybrid automatic repeat/request acknowledgment information, a modulation and coding scheme field, a new data indicator, a redundancy version field, a downlink assignment index field, a transmit power control field, a physical uplink shared channel resource indicator, a physical downlink shared channel to hybrid automatic repeat/request acknowledgment information timing indicator field, a hybrid automatic repeat/request process number, or a combination thereof.

15. The method of claim 11, further comprising:

transmitting the downlink control information in a first portion of the resource associated with the downlink control information, different than a second portion of the resource associated with the downlink control information, wherein transmitting the downlink control information in the first portion indicates to disable the hybrid automatic repeat/request acknowledgment information for the data transmission.

16. The method of claim 15, wherein the resource associated with the downlink control information comprises a control resource set, a search space set, or both.

17. The method of claim 11, further comprising:

transmitting a radio resource control configuration indicating the semi-persistent scheduling configuration associated with the data transmission, wherein the radio resource control configuration indicates to disable the hybrid automatic repeat/request acknowledgment information for the data transmission based at least in part on the radio resource control configuration.

18. The method of claim 17, wherein the radio resource control configuration comprises a semi-persistent scheduling configuration indication, a configured grant configuration indication, or both.

19. The method of claim 11, further comprising:

selecting a hybrid automatic repeat/request process number indicated in the downlink control information that indicates to disable the hybrid automatic repeat/request acknowledgment information for the data transmission.

20. The method of claim 19, wherein a first set of hybrid automatic repeat/request process numbers indicate that the hybrid automatic repeat/request acknowledgment information is disabled for the data transmission using the rateless coding scheme and a second set of hybrid automatic repeat/request process numbers indicate that the hybrid automatic repeat/request acknowledgment information is enabled for a data transmission using a non-rateless coding scheme.

21. An apparatus for wireless communication at a user equipment (UE), comprising:

one or more processors;

one or more memories coupled with the one or more processors; and instructions stored in the one or more memories and executable by the one or more processors to cause the apparatus to:

transmit a capability message indicating support for transmitting or monitoring for data transmissions associated with a rateless coding scheme in which hybrid automatic repeat/request acknowledgment information is disabled;

receive a downlink control information comprising a grant scheduling a data transmission for the UE, the data transmission utilizing the rateless coding scheme, wherein the downlink control information is based at least in part on the capability message, and wherein the hybrid automatic repeat/request acknowledgment information for the data transmission is disabled based at least in part on the data transmission utilizing the rateless coding scheme and based at least in part on one or more of: the downlink control information, a resource associated with the downlink control information, or a semi-persistent scheduling configuration associated with the data transmission; and transmit or monitor for the data transmission according to the downlink control information and the rateless coding scheme, wherein the UE refrains from monitoring for or transmitting the hybrid automatic repeat/request acknowledgment information for the data transmission in accordance with the hybrid automatic repeat/request acknowledgment information being disabled.

22. The apparatus of claim 21, wherein the hybrid automatic repeat/request acknowledgment information for the data transmission is disabled based at least in part on a radio network temporary identifier used to scramble a cyclic redundancy check portion of the downlink control information.

23. The apparatus of claim 21, wherein the hybrid automatic repeat/request acknowledgment information for the data transmission is disabled based at least in part on a field indicated in the downlink control information.

24. The apparatus of claim 23, wherein the field comprises one or more bits associated with configuring the rateless coding scheme for the UE without the hybrid automatic repeat/request acknowledgment information, a modulation and coding scheme field, a new data indicator, a redundancy version field, a downlink assignment index field, a transmit power control field, a physical uplink shared channel resource indicator, a physical downlink shared channel to hybrid automatic repeat/request acknowledgment information timing indicator field, a hybrid automatic repeat/request process number, or a combination thereof.

25. The apparatus of claim 21, wherein the instructions are further executable by the one or more processors to cause the apparatus to:

receive the downlink control information in a first portion of the resource associated with the downlink control information or a second portion of the resource associated with the downlink control information, wherein the hybrid automatic repeat/request acknowledgment information for the data transmission is disabled based at least in part on the downlink control information received in the first portion of the resource or the second portion of the resource.

26. The apparatus of claim 25, wherein the resource associated with the downlink control information comprises a control resource set, a search space set, or both.

27. An apparatus for wireless communication at a network node, comprising:

one or more processors;

one or more memories coupled with the one or more processors; and instructions stored in the one or more memories and executable by the one or more processors to cause the apparatus to:

receive a capability message indicating support for transmitting or monitoring for data transmissions associated with a rateless coding scheme in which hybrid automatic repeat/request acknowledgment information is disabled;

transmit a downlink control information comprising a grant scheduling a data transmission, with a user equipment (UE), utilizing the rateless coding scheme, wherein the downlink control information is based at least in part on the capability message, and wherein the hybrid automatic repeat/request acknowledgment information for the data transmission is disabled based at least in part on the data transmission utilizing the rateless coding scheme and based at least in part on one or more of: the downlink control information, a resource associated with the downlink control information, or a semi-persistent scheduling configuration associated with the data transmission; and transmit or monitor for the data transmission according to the downlink control information and the rateless coding scheme, wherein the network node refrains from monitoring for or transmitting the hybrid automatic repeat/request acknowledgment information for the data transmission in accordance with the hybrid automatic repeat/request acknowledgment information being disabled.

28. The apparatus of claim 27, wherein the instructions are further executable by the one or more processors to cause the apparatus to:

scramble a cyclic redundancy check portion of the downlink control information using a radio network temporary identifier that indicates to disable the hybrid automatic repeat/request acknowledgment information for the data transmission.

29. The apparatus of claim 21, wherein the instructions are further executable by the one or more processors to cause the apparatus to:

receive a radio resource control configuration indicating the semi-persistent scheduling configuration associated with the data transmission, wherein the hybrid automatic repeat/request acknowledgment information for the data transmission is disabled based at least in part on the radio resource control configuration.

30. The apparatus of claim 27, wherein the instructions are further executable by the one or more processors to cause the apparatus to:

configure a field in the downlink control information to indicate to disable the hybrid automatic repeat/request acknowledgment information for the data transmission.

* * * * *